United States Patent [19]

Mitsutake et al.

[11] Patent Number: 5,692,819
[45] Date of Patent: Dec. 2, 1997

[54] ILLUMINATING DEVICE AND PROJECTOR UTILIZING THE SAME

[75] Inventors: Hideaki Mitsutake, Tokyo; Kohtaro Yano, Yokohama; Shigeru Kawasaki, Isehara; Kazumi Kimura, Atsugi; Junko Shingaki, Yokohama, all of Japan

[73] Assignee: Canon Kabushiki Kaisha, Toyko, Japan

[21] Appl. No.: 403,549

[22] Filed: Mar. 2, 1995

Related U.S. Application Data

[63] Continuation of Ser. No. 964,083, Oct. 20, 1992, abandoned.

[30] Foreign Application Priority Data

| Oct. 21, 1991 | [JP] | Japan | 3-272699 |
| Nov. 28, 1991 | [JP] | Japan | 3-314471 |
| Dec. 11, 1991 | [JP] | Japan | 3-327615 |

[51] Int. Cl.⁶ .................................................. G03B 21/00
[52] U.S. Cl. ........................... 353/31; 353/122; 362/308
[58] Field of Search ............................... 353/31, 33, 34, 353/37, 38, 98, 99, 102, 97, 122, 101; 359/40, 49, 48; 362/268, 296, 307, 308, 311; 352/297, 261, 263

[56] References Cited

U.S. PATENT DOCUMENTS

| 3,267,802 | 8/1966 | Noble | 353/102 |
| 3,702,395 | 11/1972 | Rosendahl | 353/102 |
| 4,171,874 | 10/1979 | Bigelow et al. | 350/345 |
| 4,722,593 | 2/1988 | Shimazaki | 350/336 |
| 4,770,525 | 9/1988 | Umeda et al. | 353/122 |
| 4,824,210 | 4/1989 | Shimazaki | 353/122 |
| 4,906,080 | 3/1990 | Omata | 350/432 |
| 5,123,729 | 6/1992 | Kondo et al. | 353/102 |
| 5,192,962 | 3/1993 | Nishida et al. | 353/102 |

FOREIGN PATENT DOCUMENTS

| 0440379A2 | 7/1991 | European Pat. Off. |
| 0440379A3 | 7/1991 | European Pat. Off. |
| 3319562A1 | 2/1984 | Germany |
| 2044601 | 2/1990 | Japan |
| 2103084 | 4/1990 | Japan |

*Primary Examiner*—William Dowling
*Attorney, Agent, or Firm*—Morgan & Finnegan LLP

[57] ABSTRACT

A projector comprising a light source having first and second high-luminance light emitting areas, an illuminating optical system for directing the light, from said light source, toward an object to be illuminated, wherein said first and second high-luminance light-emitting areas are positioned on the optical axis of said illuminating optical system, and a projection optical system for projecting the light emerging from said illuminated object, wherein said illuminating optical system is constructed in such a manner that a central area of said illuminated object is illuminated by most of the light beam from said first high-luminance light-emitting area, and a peripheral area of said illuminated object is illuminated by the remainder of the light beam from said first high-luminance light emitting area and most of the light from said second high-luminance light-emitting area.

32 Claims, 22 Drawing Sheets

LAMP AXIS COORDINATES

ILLUMINATING DEVICE AND PROJECTOR UTILIZING THE SAME

This is a continuation of application Ser. No. 07/964,083, filed on Oct. 20, 1992, now abandoned.

BACKGROUND OF THE INVENTION

1. Field of the Invention

The present invention relates to an optical system including a light source and an illuminating system, adapted for use in a projector, particularly a slide projector or a liquid crystal projector.

2. Related Background Art

A conventional projector is provided, for example as shown in FIG. 1, with a light source unit 700 consisting of a light source 701 and a rotational parabolic reflector 702; a field lens 710 constituting an illuminating optical system for directing the light from said light source unit 700 toward an object to be illuminated; a transmissive liquid crystal device 720 constituting said object; and a projection lens 730 with a pupil 731, for magnified projection of the imagewise light, emerging from said liquid crystal device 720, onto a screen 740.

In the following there will be shown a numerical example, normalized by the focal length of the rotational parabolic reflector 702:

Rotational parabolic reflector 702:

Focal length: 1.00

Aperture diameter: 7.69

Field lens 710:

Material: glass (refractive index 1.52)

Shape of entrance face:

$$X = \frac{h^2}{R(1+\sqrt{1-(h/R)^2})} + B \cdot h^4$$

wherein:

X: axial distance (positive toward right in FIG. 1)

h: distance from optical axis

B: aspherical constant (=0)

R: −5.3 (1/R being taken as reference curvature)

Lens diameter: 6.15

Liquid crystal device 720:

Maximum diameter: 5.77

Projection lens 730:

Focal length: 10.57

F value: 4.5

Projection magnification: 33.3 times

Distance between rotational parabolic reflector and field lens 710: 26.15

Distance between field lens 710 and liquid crystal device 720: 0.31

Diameter of light source 701: 0.38

The light source 701 of the light source unit is positioned close to the focal point of the parabolic reflector 702, whereby the light emitted from said light source 701 is converted into a parallel light beam (for example $l_1$, $l'_1$) upon reflection by the reflector 702 and enters the field lens 710. Said parallel light beam will be focused on a point $p_2$ on the optical axis p in the projection lens 730 by the synthesized refractive power of said parabolic reflector 702 and the field lens 710 if the light source 701 is a complete point source. In practice, however, said light beam is concentrated around said point $p_2$, because the light source 701 has a finite diameter and because the reflector 702 and the field lens 710 have certain aberrations.

The liquid crystal display device 720 is so positioned, in the converging path of the parallel light beam $l_1$, $l'_1$, that a point $p_1$ of said device on the optical axis p is in imaging relationship with a point $P_3$ of the screen 740 on the optical axis p across the projection lens 730.

In the liquid crystal projectors for color display, there are known a configuration in which mosaic-patterned filters respectively transmitting red, green or blue light only are formed on the pixels of the liquid crystal device 720, or another configuration employing a liquid crystal device for each color, and dichroic mirrors for color separation and synthesis in front of and behind said liquid crystal devices.

FIG. 2 shows the structure of a metal halide lamp, which is a representative light source employed in the projectors.

In a transparent quartz bulb 11, there are provided electrodes 12, 12' connected to a power source through lead wires 14, 14'. The internal space 13 is filled with gas for discharge and light emission, such as mercury or metal halide. A pulse-shaped AC current is supplied from said power source.

FIGS. 3A and 3B schematically show the light emitting state of said metal halide lamp, wherein FIG. 3A shows the luminance distribution, seen from a direction perpendicular to the two electrodes and represented by equiluminance lines, while FIG. 3B shows the luminance distribution on a line connecting the points $\underline{a}$ and $\underline{a}'$. As shown in FIG. 3A, the luminance is high on the axis a–a' passing through the electrodes and in the vicinity thereof, but drops rapidly as the distance from said axis increases. Also as shown in FIG. 3B, in the axial area of higher luminance, there exist two areas α, α' of a particularly high luminance, close to the electrode ends.

Since the light source has a finite diameter as mentioned above, there exist rays which do not become completely parallel to the optical axis even after reflection by the parabolic reflector as shown in FIG. 4. Consequently the light beam illuminating each point of the light crystal device has a certain angle, and, under such illumination, the image light emerging from the liquid crystal device 720 (for example the image of a point $p_4$) is focused on a point $p_7$ on the screen 740, through the projection lens 730. In an ideal system containing all the illustrated illuminating light beams and free from vignetting in the projection lens 730, the light beam involved in the imaging on the off-axis point $p_4$ is emitted within an angular range $\angle p_5 p_4 p_6$ (wherein $p_5$ and $p_6$ are end points of the diaphragm 731 of the projection lens 730) through the projection lens 730. Said angle $\angle p_5 p_4 p_6$ is represented by the numerical aperture (or F-number in approximation) of the projection lens 730.

In practice, however, the light beams do not necessarily exist within the entire range $\angle p_5 p_4 p_6$. This applied also to other image points. Since the image becomes darker in an image point scarce in light beams and the image becomes brighter in an image point rich in light beams, the brightness of the projected image becomes uneven.

The actual presence of such light beams can be verified by so-called inverse tracing method in which the light path is traced from the image point to the object point. As an example, in case of FIG. 4, the optical paths from the image points $p_3$, $p_7$ are traced through the projection lens 730, and, after focusing on the points $p_1$, $p_4$ of the liquid crystal device 720, through the field lens 710 to the light source unit 700, and the state of the rays in the vicinity of the light source 701 is examined.

Rays which do not return to the light source 701 in such inverse tracing do not exist in the actual projection, and the brightness is reduced in an image point having a large proportion of such light rays.

FIGS. 5 and 6 show the states of rays around the light source 701, obtained as a result of inverse tracing from an axial image point $p_3$ on the screen 740 shown in FIG. 4 and an off-axis point $p_7$.

Referring to FIG. 5, rays $l_3$–$l_{11}$ emerge from said point $p_3$ within an angular range $\angle p_5 p_3 p_6$, then are focused on the point $p_1$ of the liquid crystal device 720 by the projection lens 730 and return to the light source unit 700. In said light source unit 700, said inversely traced rays $l_3$–$l_{11}$ are respectively reflected at points $a_1$–$a_9$ of the parabolic reflector 702 and proceed to the light source 701. In this case, as shown in FIG. 5, all the inversely traced rays $l_3$–$l_{11}$ substantially return to the light source 701. This indicates that the rays emitted from said light source 701 are effectively focused on the image point $p_3$ of the screen 704.

Then, referring to FIG. 6, inverse tracing rays $l_{12}$–$l_{20}$ emerge from said point $p_7$ within an angular range $\angle p_5 p_7 p_6$ (see FIG. 4), then a focused by the projection lens 730 onto the point $p_4$ on the liquid crystal device 720 and return to the light source unit 700. In said unit 700, the rays $l_{12}$–$l_{20}$ are respectively reflected in points $a_{10}$–$a_{18}$ of the parabolic reflector 702 and are directed toward the light source 701. In this case, among the inverse tracing rays $l_{12}$–$l_{20}$, the rays $l_{17}$, $l_{18}$ and $l_{19}$ reflected on the points $a_{15}$, $a_{16}$ and $a_{17}$ substantially return to the light source 701 as shown in FIG. 6 but other rays do not pass the position of the light source 701. This indicates, as explained before, that the rays corresponding to said inverse tracing rays $l_{12}$–$l_{15}$, $l_{19}$, $l_{20}$ do not exist at the actual projection, so that the brightness at said image point $p_7$ is accordingly reduced. Said brightness reduction becomes larger in the peripheral area distant from the optical axis, and has been a major obstacle in attaining high image quality and a large image size in the projectors.

Also the conventional apparatus has been associated with the following drawback.

Though FIG. 4 illustrates a case in which the projection lens 730 is free from vignetting and the diaphragm 731 coincides with the pupil, the actual system involves vignetting and has the diaphragm 731 and the pupil 732 in different positions as shown in FIG. 7. In FIG. 7, rays in chain lines indicate the axial and off-axis imaging state of the diaphragm 731, and a false image of the diaphragm 731, seen from the side of the liquid crystal device 720 is the pupil 732, thus positioned different from the diaphragm 731. Also $p_2'$, $p_5'$, $p_6'$ define the pupil relating to the imaging of axial light beam, while $p_5''$, $p_6''$, $p_7''$ define the pupil relating to the off-axis light beam coming from the point $p_4$, with respective centers at $p_2'$ and $p_7''$. Also an ideal imaging light beam from the point $p_4$ is represented by solid lines.

As shown in FIG. 7, the pupil relating to the imaging of off-axis points such as $p_4$ is smaller than the pupil relating to the imaging of axial point, and the illuminating light beam indicated by broken lines generates a light beam deviated from the ideal imaging light beam indicated by the solid lines. Consequently the central ray of the imaging light beam is not directed toward the center $p_7''$ of the pupil, and the light beam in the peripheral part is not accommodated within the pupil.

SUMMARY OF THE INVENTION

In consideration of the foregoing, an object of the present invention is to provide a projector capable of increasing the luminance of the projected image in the peripheral part thereof, and providing a projected image of higher quality.

Another object of the present invention is to provide a projector capable of image display of a high resolving power both in the central part and in the peripheral part of the projected image.

According to the present invention, there is provided a projection display apparatus provided with a light source; an illuminating optical system for illuminating an object by the light from said light source; and a projection optical system with vignetting, for projecting the image of said illuminated object, thereby displaying the pattern of said object;

wherein an auxiliary optical system is provided in said illuminating optical system in the vicinity of said object, for controlling the incident angles of rays at center of gravity of the light beams illuminating the points of said object present outside the optical axis of said projection optical system in such a manner that each ray at center of gravity of the illuminating light beam is directed toward the approximate center of the pupil, of which position is variable for each of said points by the vignetting, of said projection optical system.

Still another object of the present invention is to provide an illuminating optical system capable of effectively utilizing the light emitting part, with a particularly high luminance, of a discharge lamp such as a metal halide lamp, and a projection display apparatus capable of providing a large-sized display with a high luminance both in the central and peripheral areas of the projected image. According to the present invention there is provided a projection display apparatus provided with a light source having first and second high-luminance light emitting areas; an illuminating optical system for directing the light from said light source toward an object; and a projection optical system for projecting the image of said object, wherein the first and second high-luminance light emitting areas of said light source are positioned on the optical axis of said illuminating optical system, and said illuminating optical system is constructed in such a manner that the central area of said object is illuminated by the light beam from the first high-luminance light emitting area of said light source while the peripheral area of said object is illuminated by the light beams from the first and second high-luminance light emitting areas of said light source.

Still another object of the present invention is to provide an illuminating optical system capable of effectively utilizing the light emitting part, with a particularly high luminance, of a discharge lamp such as a metal halide lamp, and a projection display apparatus capable of an image display with a high resolving power both in the central and peripheral areas of the projected image. According to the present invention there is provided a projection display apparatus provided with a light source having first and second high-luminance light emitting areas; an illuminating optical system composed of a reflector of a first focal length for directing the light from said light source toward an object; and a projection optical system for projecting the image of said object, wherein the first and second high-luminance light emitting areas of said light source are positioned on the optical axis of said illuminating optical system, and an optical element having a second focal length smaller than the first focal length is provided in a near-axis area of said reflector in such a manner that the peripheral area of said object is illuminated by the light coming from said first high-luminance light emitting area by way of said reflector and by the light coming from said second high-luminance light emitting area through said optical element.

BRIEF DESCRIPTION OF THE DRAWINGS

FIGS. 13A and 13B are charts showing an example of the result of inverse tracing of rays from an off-axis image point $P_n$ on the screen for a given curvature of the field lens, in the projector of the present invention, wherein FIG. 13A shows variation in the distances $d_1$, $d_2$ from the focal point of a rotational parabolic reflector to inversely traced rays, in the vicinity of the light source, as a function of the distance H from the optical axis to the image $P_n$, while FIG. 13B shows variation in the light beam spreading width D as a function of said distance H;

FIGS. 14A and 14B are charts showing an example of the result of inverse tracing of rays from an off-axis image point on the screen, for a given curvature of the field lens, as a function of the aspherical constant B of said field lens in the projector of the present invention, wherein FIG. 14A shows variation of the distances $d_1$, $d_2$ from the focal point of the rotational parabolic reflector to the inversely traced rays, in the vicinity of the light source, as a function of the aspherical constant B, while FIG. 14B shows variation of the light beam spreading width D as a function of said aspherical constant B;

FIGS. 15A and 15B are charts showing an example of the result of inverse tracing of rays from an off-axis image point on the screen, for a given curvature and a given aspherical constant B of the field lens in the projector of the present invention, wherein FIG. 15A shows variation of the distances $d_1$, $d_2$ from the focal point of the rotational parabolic reflector to the inversely traced rays, in the vicinity of the light source, as a function of the distance H from the optical axis to the image point $P_n$, while FIG. 15B shows variation in the light beam spreading width D as a function of said distance H;

DETAILED DESCRIPTION OF THE PREFERRED EMBODIMENTS

Figure 8:
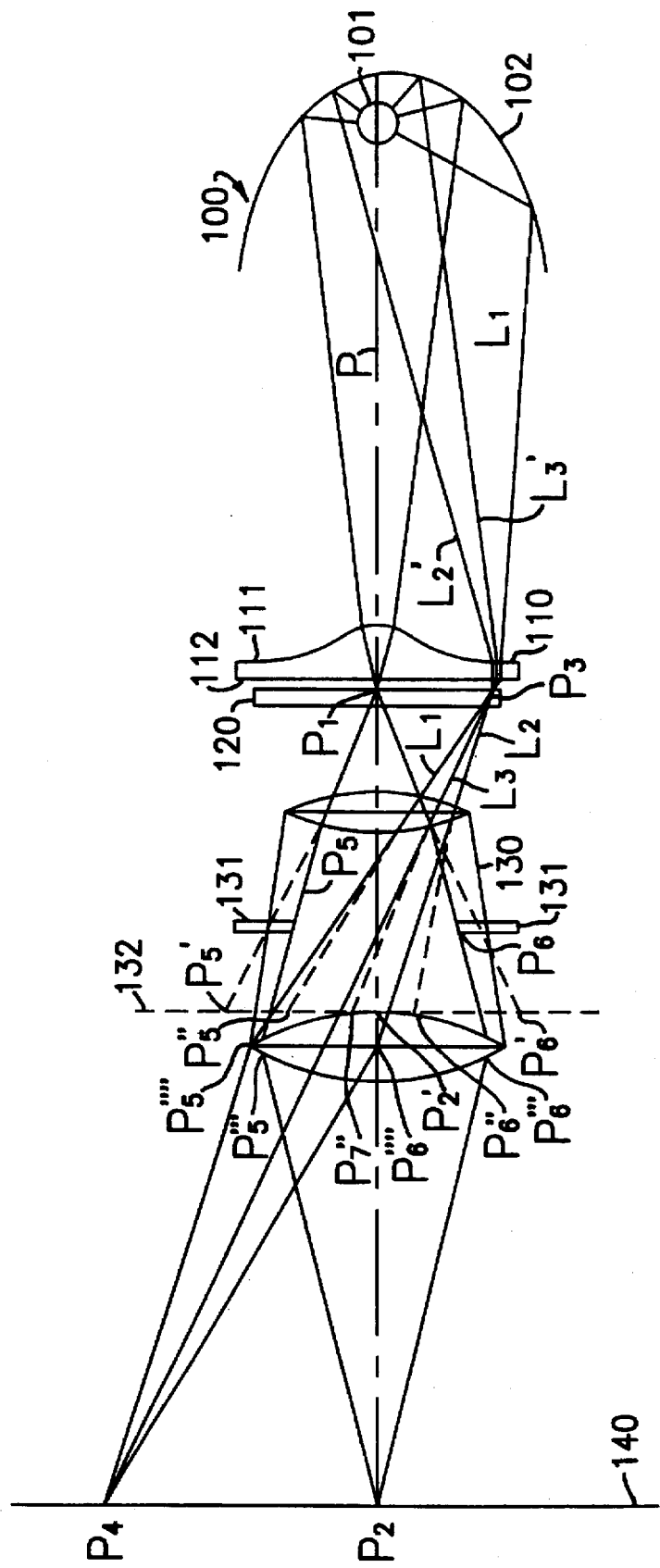
FIG. 8 is a view showing the configuration of an embodiment of the projector of the present invention.

FIG. 8 illustrates an embodiment of the projector of the present invention.

The projector of the present embodiment is provided with a light source unit 100 composed of a rotational parabolic reflector 102 and a light source 101 positioned in the vicinity of the focal point thereof; a field lens 110 constituting a condensing optical element of which refractive power is different between a central area and a peripheral area thereof; a transmissive liquid crystal display device 120 constituting an object to be illuminated; and a projection lens 130 with a diaphragm 131, for magnified projection of the image light emerging from said device 120 onto a screen 140.

In said field lens 110, in order to vary the refractive power between the central area and the peripheral area thereof, the entrance face 111 is formed as an aspherical shape of which curvature is different between the central area and the peripheral area, while the exit face 112 is formed flat.

In the present embodiment, the entrance face 111 of the field lens 110 is formed, in the central area thereof, as a spherical face with a larger curvature in order to attain a higher refractive power in said central area, and, in the peripheral area, has a smaller curvature.

In the present embodiment, the position of the field lens 110 is so determined as to satisfy a condition:

$f=1/\phi>e_1>\Delta x/2NA$ wherein $e_1$ is the axial distance between the liquid crystal device 120 and the entrance face 111 of the field lens 110, $\phi$ is the power of the lens 110 (=1/focal length f) or the aperture diameter of the rotational parabolic reflector 102, NA is the numerical aperture of the projection lens 130 at the side of the device 120, and $\Delta x$ is the tolerable eccentricity error of the field lens 110.

The meaning of this condition will be explained with reference to FIGS. 9 and 10.

Figure 9:
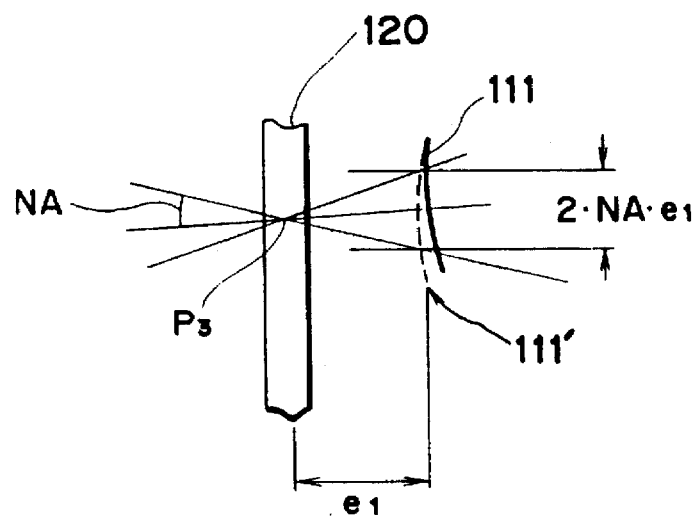
FIGS. 9 and 10 are views showing the method for determining the arrangement of the field lens in the projector shown in FIG. 8.

FIG. 9 is a partial magnified view of the apparatus shown in FIG. 8. In case the entrance face 111 of the field lens 110 is positioned eccentrically by $\Delta x$ from the ideal position due to an installation error or a lens working error, the influence of said eccentricity $\Delta x$ is reduced by the effect of spreading of the illuminating and imaging light beam, if it is smaller than $2NA \cdot e_1$ which is the length of the imaging light beam cut by the entrance face 111. Consequently there stands a relation:

$\Delta x<2NA \cdot e_1$ so that there is obtained a relation:

$e_1>\Delta x/2NA$ (1).

Figure 10:
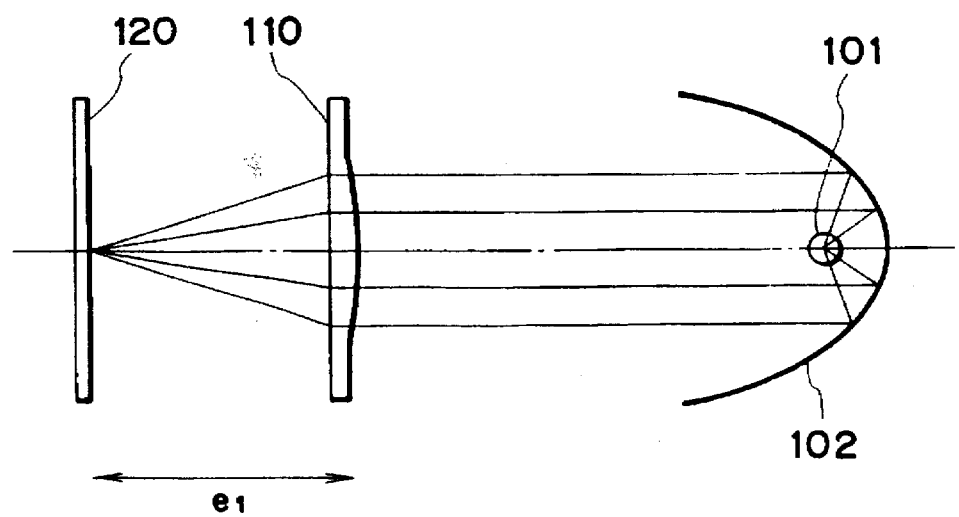

On the other hand, in case of $e_1=1/\phi$, the light beam emerging from a predetermined point of the light source 101 is concentrated on the center of the liquid crystal device 120, as shown in FIG. 10. The light source 101 usually has a light emitting area of a finite size, with uneven luminance distribution therein. The configuration shown in FIG. 10 is undesirable, because the uneven luminance distribution in the light emitting area of the light source 101 is reflected on the liquid crystal device 102. Consequently there stands a relation:

$e_1<1/\phi=f$ (2).

Under a condition $e_1>1/\phi$, the efficiency of light utilization is deteriorated because the illuminating light beam is focused in front of the liquid crystal device 120 at the side of the light source 101, so that said device 120 is illuminated by a diverging light beam.

The above-mentioned condition can be obtained from the relations (1) and (2).

Figure 1:
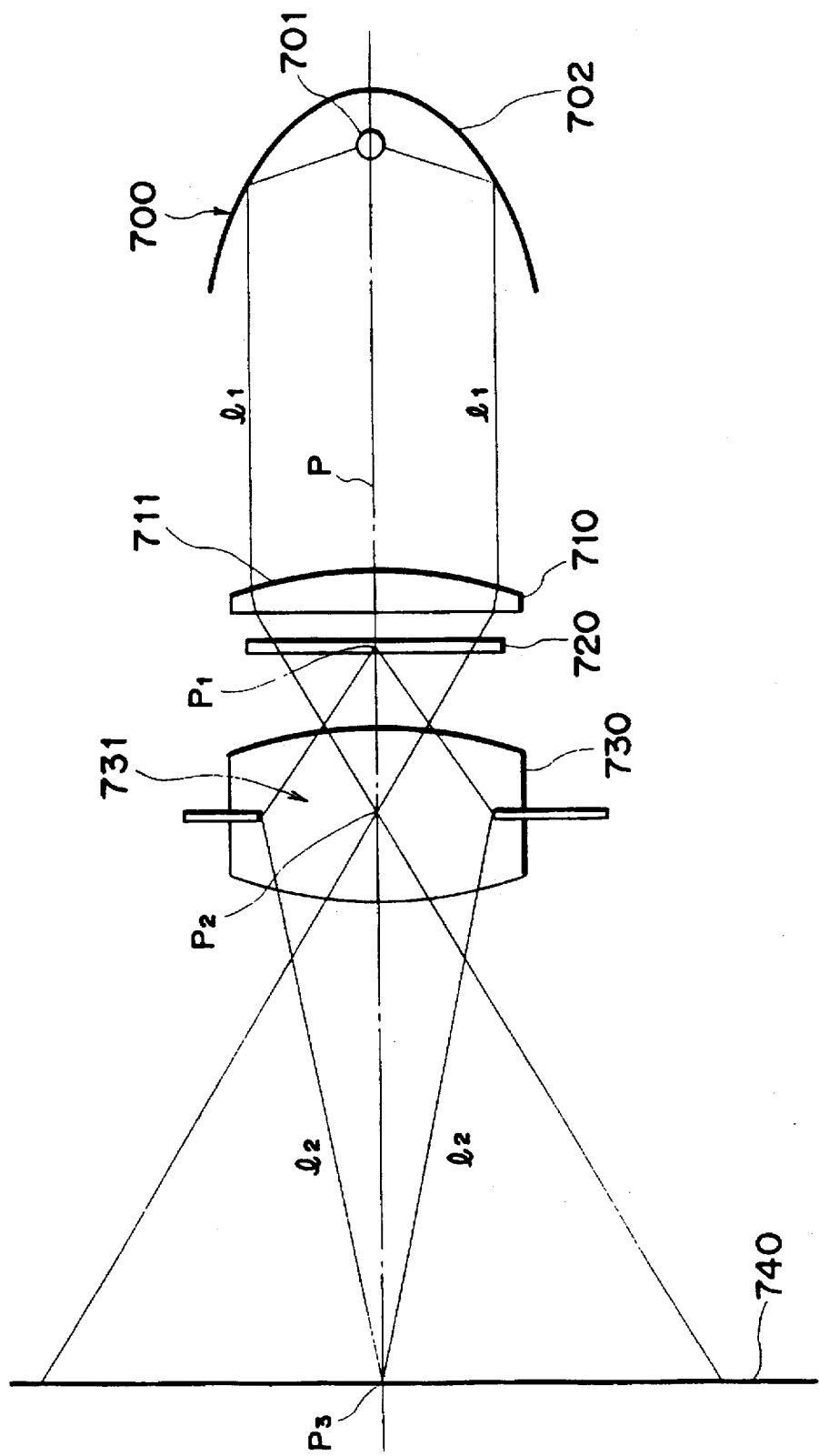
FIG. 1 is a view showing the configuration of an example of the conventional projector.

Under the application of a video signal, the liquid crystal device 120 functions as an optical shutter for each pixel, thus emitting image light by modulating the polarizing direction of the incident light. For this purpose, on the entrance side and the exit side of the liquid crystal device 120 there are respectively provided a polarizer (not shown) for polarizing the illuminating light beam and a detector (not shown) for extracting the image light. Said polarizer and detector are generally composed of polarizing plates or polarizing beam splitter. For displaying a color image with the projector utilizing liquid crystal device, there are generally employed plural liquid crystal devices and a color synthesizing optical system positioned between said devices and the projection optical system. Consequently there is employed the projection lens 130 of a retro focus type with a large rear focal length. The screen 140 can be of reflective or transmissive type, which is respectively viewed from the right or left side in FIG. 1.

In the following there will be shown a numerical example of the projector of the present embodiment, normalized to the focal length of the parabolic reflector 102:
Rotational parabolic reflector 102:
  Focal length: 1.00
  Aperture diameter: 7.69
Field lens 100:
  Material: glass (refractive index 1.52)
  Shape of entrance face 111:

$$X=\frac{h^2}{R(1+\sqrt{1-(h/R)^2}\ )}+B \cdot h^4$$

wherein:
  X: axial length (positive toward right)
  h: distance from the optical axis
  B: aspherical constant ($=2.75 \times 10^{-4}$)
  R: $-5.3$(1/R taken as reference curvature)
  Lens diameter: 6.15
Liquid crystal device 120:
  Maximum diameter: 5.77
Projection lens 130:
  Focal length: 10.57
  F-number: 4.5
  Projection magnification: 33.3 times
Distance between the parabolic reflector 102 and the condenser lens: 26.15
Distance between the field lens 110 and the liquid crystal device 120: 0.31
Diameter of light source 101: 0.38

The liquid crystal device 120 is so positioned, in the path of a converging light beam obtained by the field lens 110 from the parallel light beam emitted from the light source unit 100, that an axial point $P_1$ of said device 120 is in an imaging relationship with an axial point $P_2$ of the screen 140 across the projection lens 130. Also the eccentricity error tolerance $\Delta x$ can be about 0.1% of the lens diameter. In the field lens of the present example $\Delta x=0.006$ so that the above-mentioned condition is satisfied.

Referring to FIG. 8, the light beam relating to the point $P_1$ and that relating to the point $P_3$ can be controlled separately by an aspherical optical element positioned close to the liquid crystal device 120, since said light beams are present in difference areas in the vicinity of the liquid crystal device 120 and of the screen 140.

Also referring to FIG. 8, a false image of the diaphragm 131 of the projection lens 130, when seen from the side of the liquid crystal device 120, is positioned at the pupil 132, so that the pupil relating to the axial imaging light beam is defined by $P_5'P_2'P_6'$ while the pupil relating to the off-axis imaging light beam is defined by $P_5''P_7''P_6''$. An imaging light beam for forming the image of the point $P_3$ at the point $P_4$ is represented by rays $L_1, L_2, L_3$ and $L_1', L_2', L_3'$, in which the rays $L_1, L_3, L_1', L_3'$ are directed toward the ends $P_5'', P_6''$ of the pupil, and the ray $L_2, L_2'$ is the ray at center of gravity within the imaging (illuminating) light beam. The ray at the center of gravity means a ray at the position of center of gravity of the cross-sectional intensity distribution of the imaging light beam, or the central ray (if the intensity distribution is symmetrical with respect to the center, the central ray coincides with the ray at the center of gravity). In the present embodiment, the shape of the field lens 110 is so determined that the off-axis ray $L_3, L_3'$ at center of gravity is directed toward the center $p_7''$ of the corresponding pupil, thereby reducing the vignetting of the off-axis imaging light beam and thus increasing the luminance of the off-axis image point on the screen 140.

Also the field lens 110 is positioned distant from the light source 101, in order to avoid thermal influence such as distortion or cracking. Absence of thermal distortion avoids variation in the focal length etc. of the lens, and allows the use of a plastic lens that can be easily formed in an aspherical shape.

Also the present embodiment provides an advantage that the ray of center of gravity can be easily directed toward the center of the corresponding pupil, since the direction of the ray of center of gravity of the off-axis illuminating light beam is controlled at a position close to the projection lens 130.

In the following there will be explained the method of determining the shape of the entrance face 111 of said field lens 110.

Also in this case, the aforementioned inverse tracing is conducted on the axial image point $P_2$ and the off-axis image point $P_4$ on the screen 140.

With respect to the image point $P_2$, there is considered a light beam present in an angular range $\angle P_5'''P_2P_6'''$. Said light beam relating to the image point $P_2$ can be considered similarly to that relating to the axial image point $P_3$ on the screen 740 in the aforementioned projector shown in FIG. 4, and, substantially all the rays return, in said tracing, to the light source (cf. FIG. 5).

Figure 11:
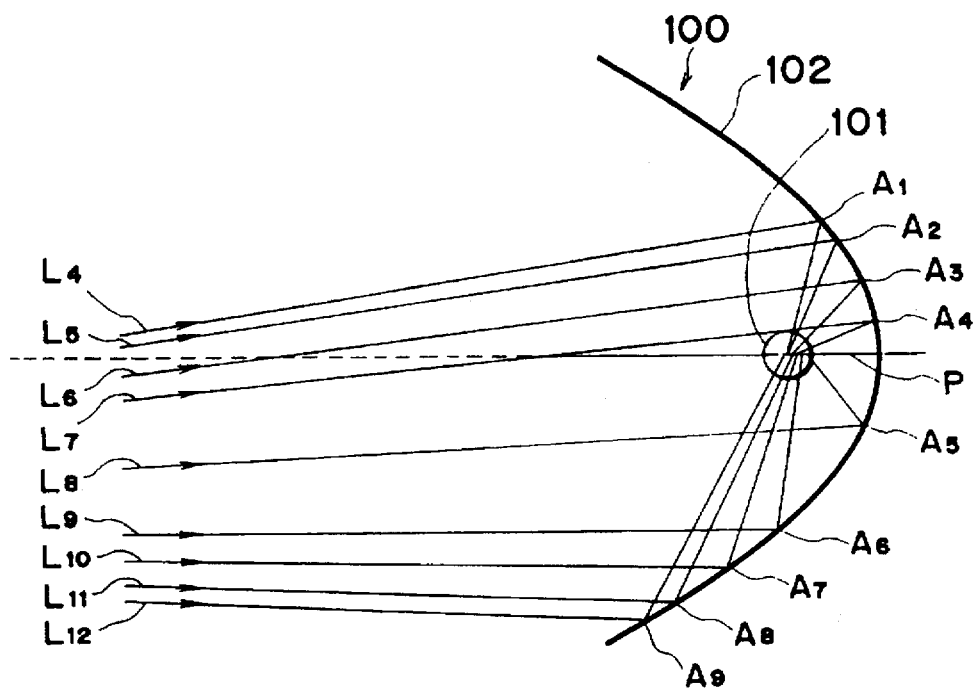
FIG. 11 is a view showing an example of inversely traced rays in the projector of the present invention.

With respect to the off-axis image point $P_4$, there is considered a light beam present in an angular range $\angle P_5'''P_4P_6'''$. Said light beam emerging from said image point $P_4$ is focused by the projection lens 130 on the point $P_3$ on the liquid crystal device 120, and returns to the light source unit 100 as shown in FIG. 11. Referring to FIG. 11, rays $L_4$–$L_{12}$ returning to the light source unit 100 are respectively reflected at points $A_1$–$A_9$ on the parabolic reflector 102, and substantially all the rays are concentrated on the light source 101, namely in the vicinity of the focal point of the parabolic reflector 102. This means that, in the actual projection, the light beam emitted from the light source 101 is efficiently involved in the imaging onto said image point $P_4$, so that the brightness of the image on said image point $P_4$ is improved. A similar situation stands likewise at other image points, so that the brightness of the image in the peripheral area is improved in comparison with the conventional configuration.

Now, let us consider, in the above-explained inverse tracing of rays, the spreading width D of the inversely traced light beam on the optical axis P in the vicinity of the light source 101.

Said spreading width D is defined, in case of FIG. 11, among the inversely traced rays $L_4$–$L_{12}$, by the distance between those at the left- and right-hand ends when they cross the optical axis after being reflected by the parabolic reflector 102. Also the distances of the crossing points of said rays at the left- and right-hand ends with the optical axis P to the focal point of said parabolic reflector 102 are represented respectively by $d_1$, $d_2$.

Figure 12:
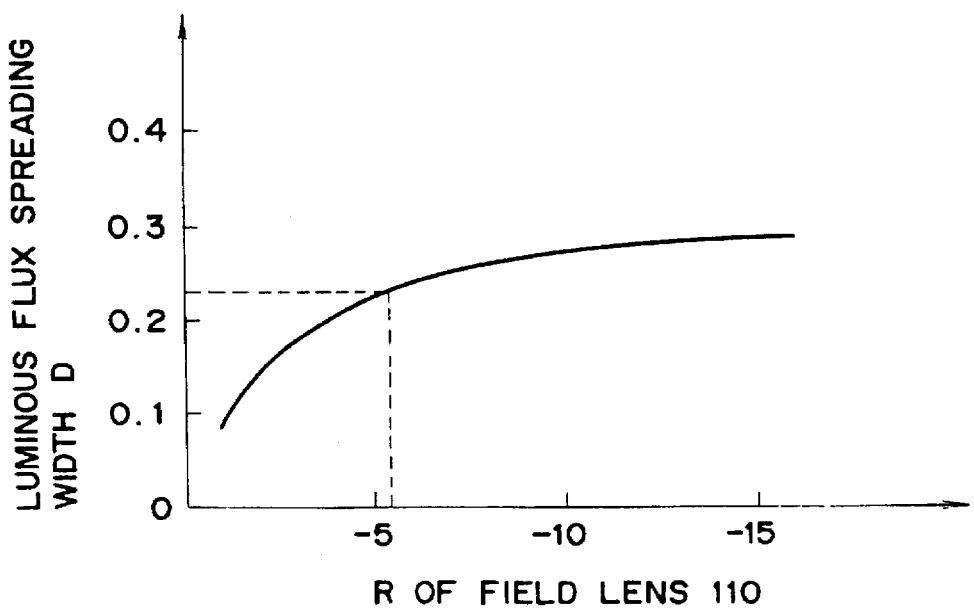
FIG. 12 is a chart showing an example of variation in the spreading width D as a function of curvature of the field lens in the projector of the present invention.

FIG. 12 shows the variation of the spreading width D of the inversely traced light beam relative to the axial image point $P_2$ on the screen 140, as a function of R of the field lens 110 of the aforementioned conventional projector wherein the aspherical constant B is equal to zero.

As will be apparent from FIG. 12, the spreading width D of the light beam becomes smaller as R of the field lens 110 becomes smaller, namely as the curvature 1/R of said field lens 110 becomes larger. Within the variable range of R of the field lens 110 shown in FIG. 12, the spreading width D does not exceed 0.3. Since the diameter of the light source 101 in the projector of the present embodiment is 0.38, it is possible to concentrate the inversely traced light beam relative to said image point $P_2$ onto the light source 101.

However, the above-explained light source does not have a uniform luminance distribution but has high luminance areas and low luminance areas. For example, in a discharge lamp such as a metal halide lamp or a xenon lamp, the luminance is very high in the vicinity of the electrodes and becomes lower as the distance from the electrode increases. Consequently, in order to increase the luminance of the axial image point $P_2$ on said screen 140, said spreading width D should preferably be smaller, in consideration of the necessity for setting the optical system in such a manner that said inversely traced light beam can reach the high luminance area of the light source 101. However, an excessively small spreading width D will result in unevenness in color, and the R of the field lens 110 is to be determined in consideration of these facts.

In the present embodiment, the field lens 110 has an axial thickness of 0.985 and a diameter of 6.15 as mentioned before, and a parameter R=5.3 (1/R=0.189) is determined in consideration of the limits in the physical shape of such lens. In this case the spreading width D is 0.242 according to FIG. 12, and the focal length of the field lens 110 is 10.261. Also the results of inverse tracing relative to the off-axis image point $P_n$ on the screen 140 are shown in FIGS. 13A and 13B.

Figure 13B:
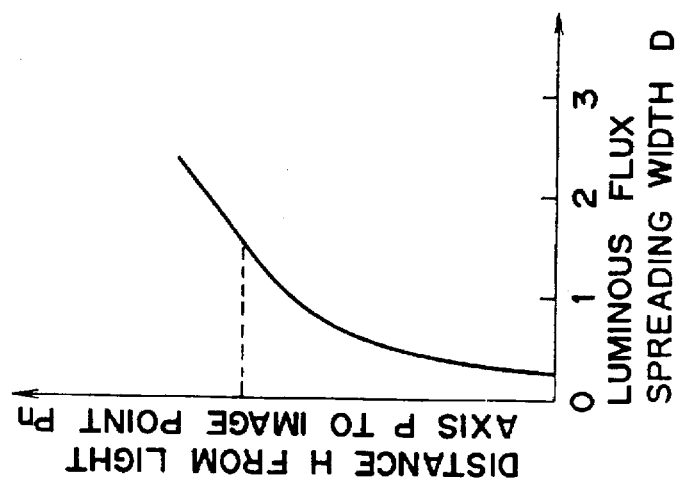
Figure 13A:
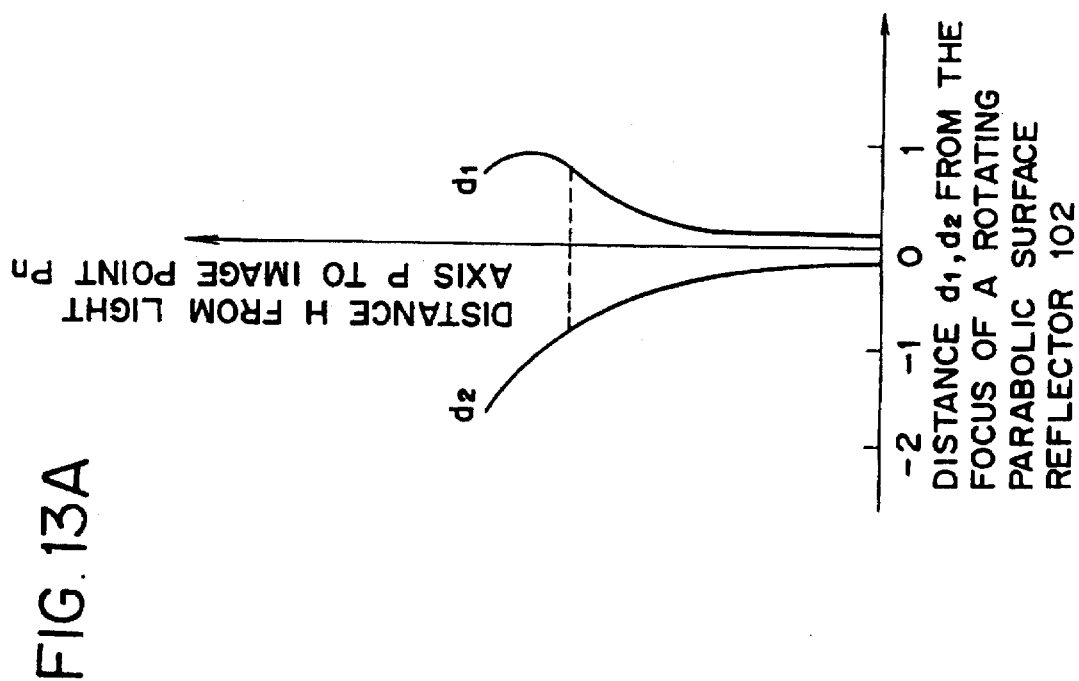

FIG. 13A shows the variations of the distances $d_1$, $d_2$ from the focal point of the parabolic reflector 102 to the rays at the left- and right-hand ends as a function of the distance H from said image point $P_n$ to the optical axis P, and the original point on the abscissa corresponds to the focal point of the parabolic reflector 102. FIG. 13B shows the variation of the spreading width D of the light beam, as a function of said distance H.

As will be apparent from FIGS. 13A and 13B, the spreading width D becomes larger with the increase in the distance H from the optical axis P, so that the inversely traced light beam reaches less the light source 101. This means that the projected image on the screen 140 becomes darker in the peripheral area than in the central area close to the optical axis P.

Figure 14B:
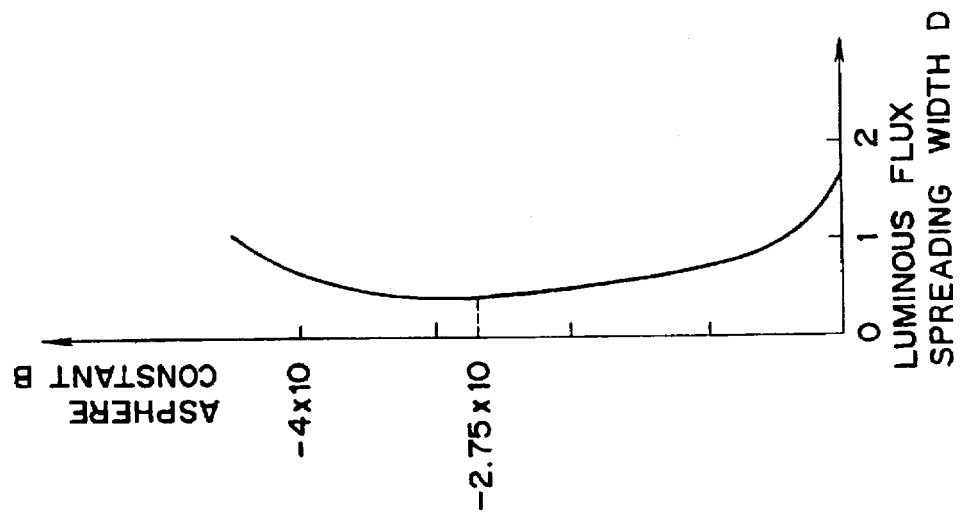
Figure 14A:
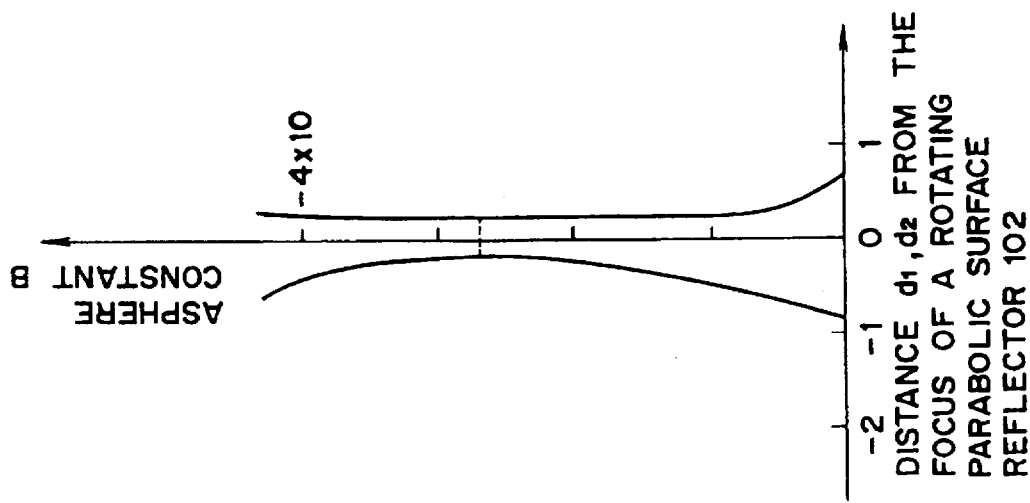

Then, FIGS. 14A and 14B show the results of inverse tracing relative to an image point at 80% of the maximum distance, from the optical axis P, in the projected image on the screen 140, as a function of the aspherical constant B while R of the field lens 110 is maintained constant.

FIG. 14A shows the variations in the distances $d_1$, $d_2$ from the focal point of the parabolic reflector 102 to the rays at the left- and right-hand ends, as a function of the aspherical constant B, wherein the original point of the abscissa corresponds to the focal point of the parabolic reflector 102. FIG. 14B shows the variation of the spreading width D of the light beam as a function of the aspherical constant B.

As shown in FIGS. 14A and 14B, the spreading width D decreases with the increase in the aspherical constant B, but increases around an aspherical constant of $B=2.75\times10^{-4}$.

Figure 15B:
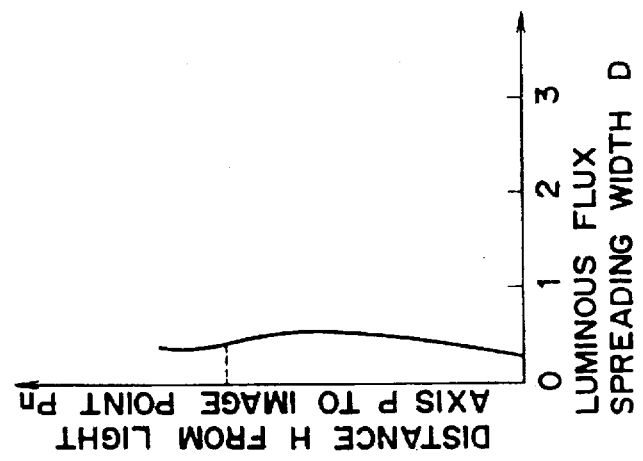
Figure 15A:
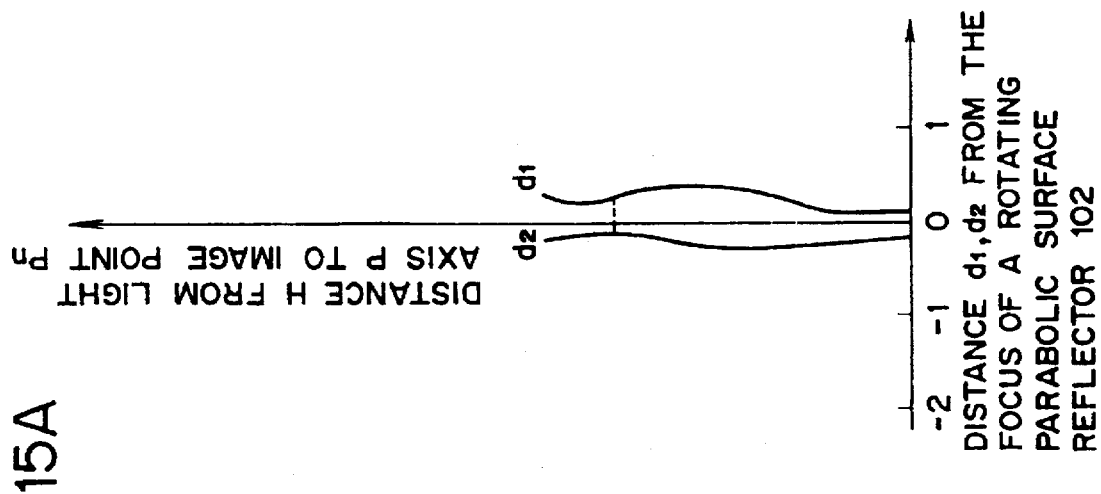

Then, FIGS. 15A and 15B show the results of inverse tracing relative to the aforementioned image point $P_n$ in case the curvature 1/R=0.189 and the aspherical constant $B=2.75\times10^{-4}$.

FIG. 15A shows the variations in the distances $d_1$, $d_2$ from the focal point of the parabolic reflector 102 to the rays at left- and right-hand ends as a function of the distance H from the optical axis P to the image point $P_n$, wherein the original point of the abscissa corresponds to the focal point of said reflector 102. FIG. 15B shows the variation in the spreading width D of the light beam as a function of said distance H.

In comparison with the aforementioned case of 1/R=0.189 and B=0 shown in FIGS. 13A and 13B, the present case shown in FIGS. 15A and 15B shows a significant decrease in the spreading width D. Also the shorter distances $d_1$, $d_2$ from the focal point of the parabolic reflector 102 as shown in FIG. 15A indicate that the light beam from the light source 101 reaches the screen 140 effectively, so that a sufficiently bright image can be obtained even in the peripheral area of the screen 140.

The field lens 110 in the present embodiment has an aspherical face only at the entrance side, but the present invention is not limited to such embodiment and can employ a lens having aspherical faces both in the entrance side and in the exit side, or a Fresnel lens.

Also the present embodiment obtains a parallel light beam by placing the light source 101 at the focal point of a rotational parabolic reflector 102, but there may also be employed a rotational elliptical reflector. In such case, a parallel light beam can be obtained by placing the light source on the focal point of a rotational elliptical reflector and passing the light, reflected by said reflector, through an optical element such as a lens.

Also in case the light source and the reflector of the light source unit are oblong, a similar effect can be attained by forming the field lens 110 as a cylindrical lens.

In case the illuminated object is a liquid crystal device, there may be employed, as the polarizer therefor, a polarization converting module which separates the light from the light source into the polarized lights of different polarizing directions and aligns the polarizing direction of one of said polarized lights to that of the other. In this manner the efficiency of utilization of the light from the light source can be further increased, whereby a further increase in the luminance of the projected image can be attained. Furthermore, though the above-explained employs a liquid crystal device, there may be employed three liquid crystal devices for color image display.

In a projector for color image display, the illuminating optical system is provided with a color separation optical system for separating the light from the light source into colored lights respectively corresponding to said three liquid crystal devices, and the projection optical system is provided with a color synthesizing optical system for synthesizing the image lights of different colors emerging from said three liquid crystal devices. Such color separation optical system and color synthesizing optical system can be composed for example of dichroic mirrors consisting of dielectric multi-layered films, cross dichroic mirrors each composed of plural dichroic mirrors, or dichroic prisms.

Figure 3A:
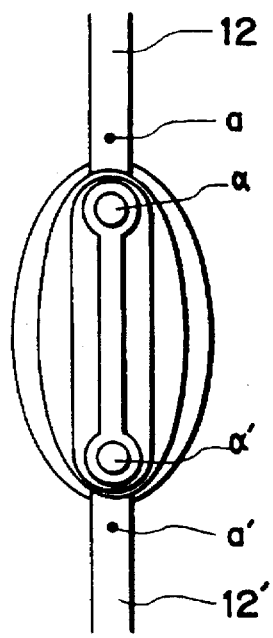
FIGS. 3A and 3B are views showing the distribution of luminance of a metal halide lamp.
Figure 3B:
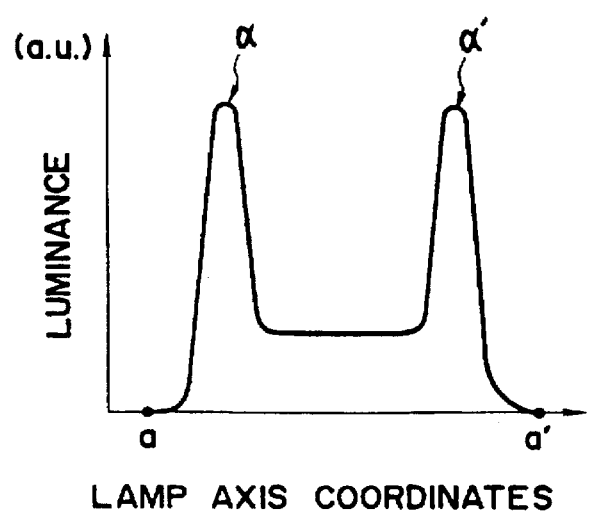
Figure 4:
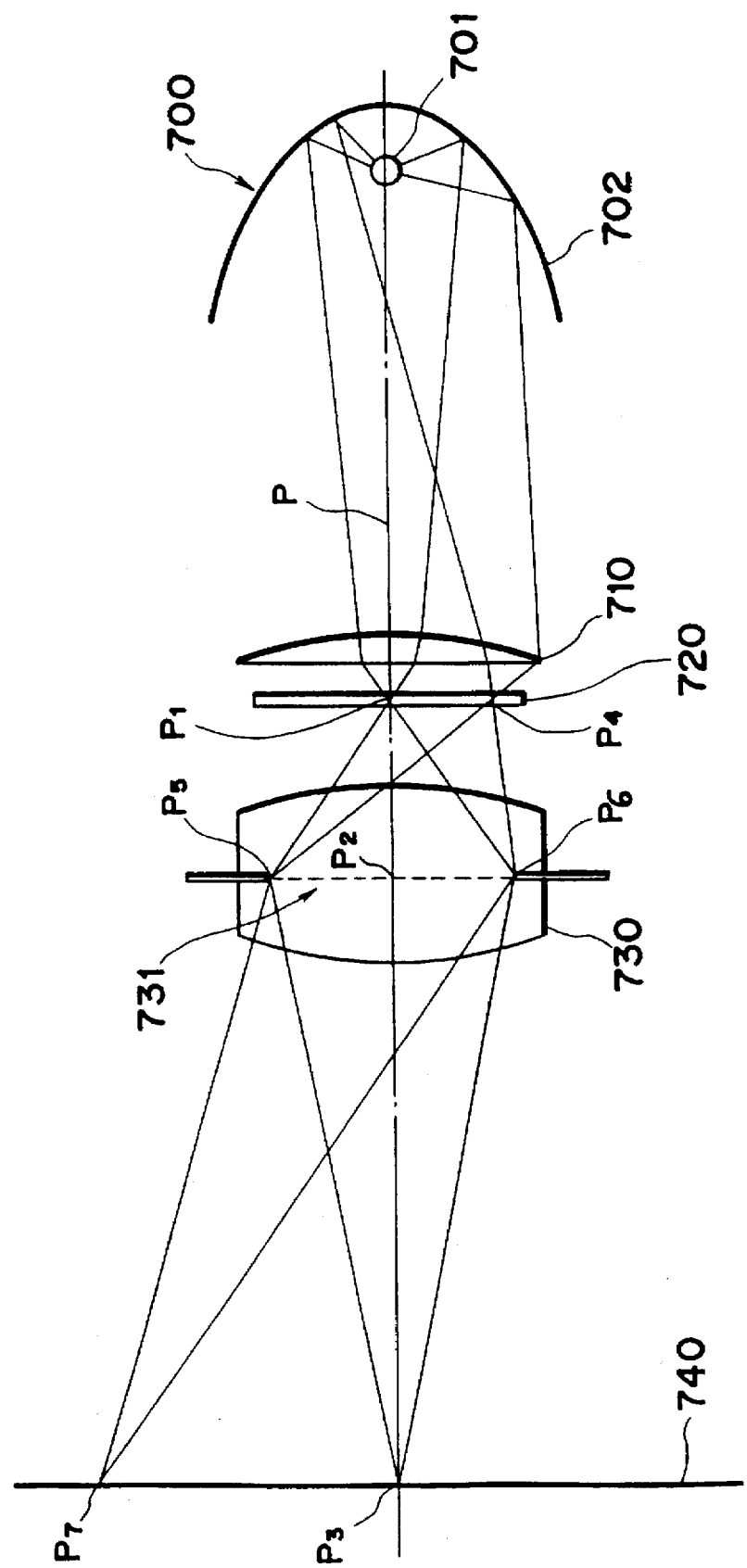
FIG. 4 is a view showing an example of imaging on a screen in a conventional projector.
Figure 5:
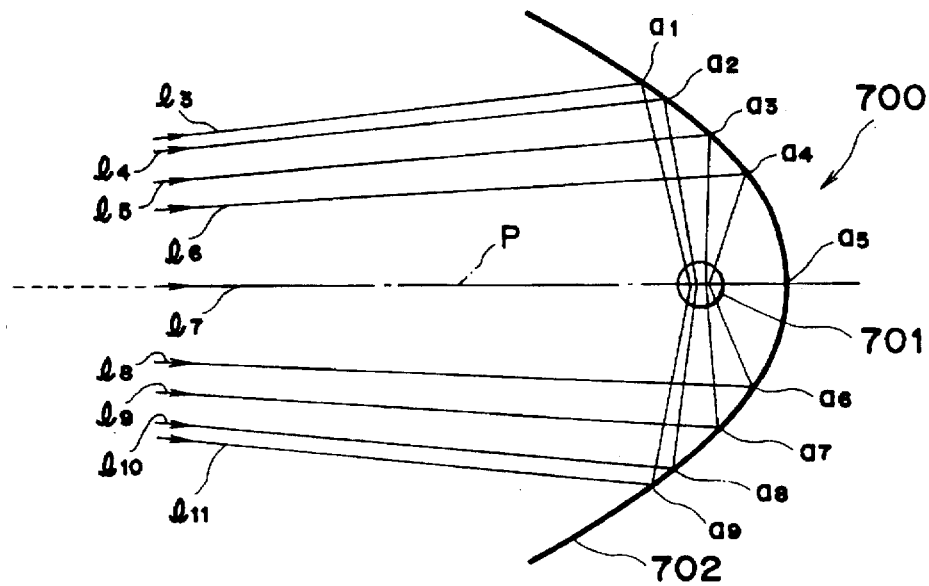
FIG. 5 is a view showing an example of inverse tracing rays around the light source, obtained by inverse tracing of rays from an axial image point on the screen in a conventional projector.
Figure 6:
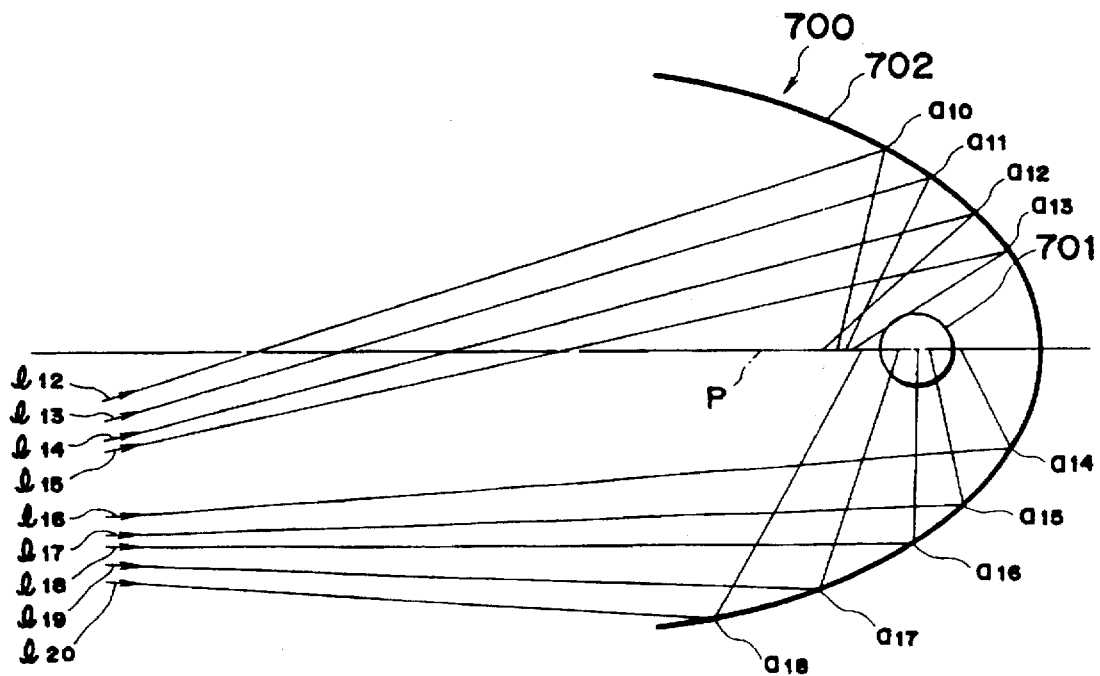
FIG. 6 is a view showing an example of inverse tracing rays around the light source, obtained by inverse tracing of rays from an off-axis image point on the screen in a conventional projector.
Figure 7:
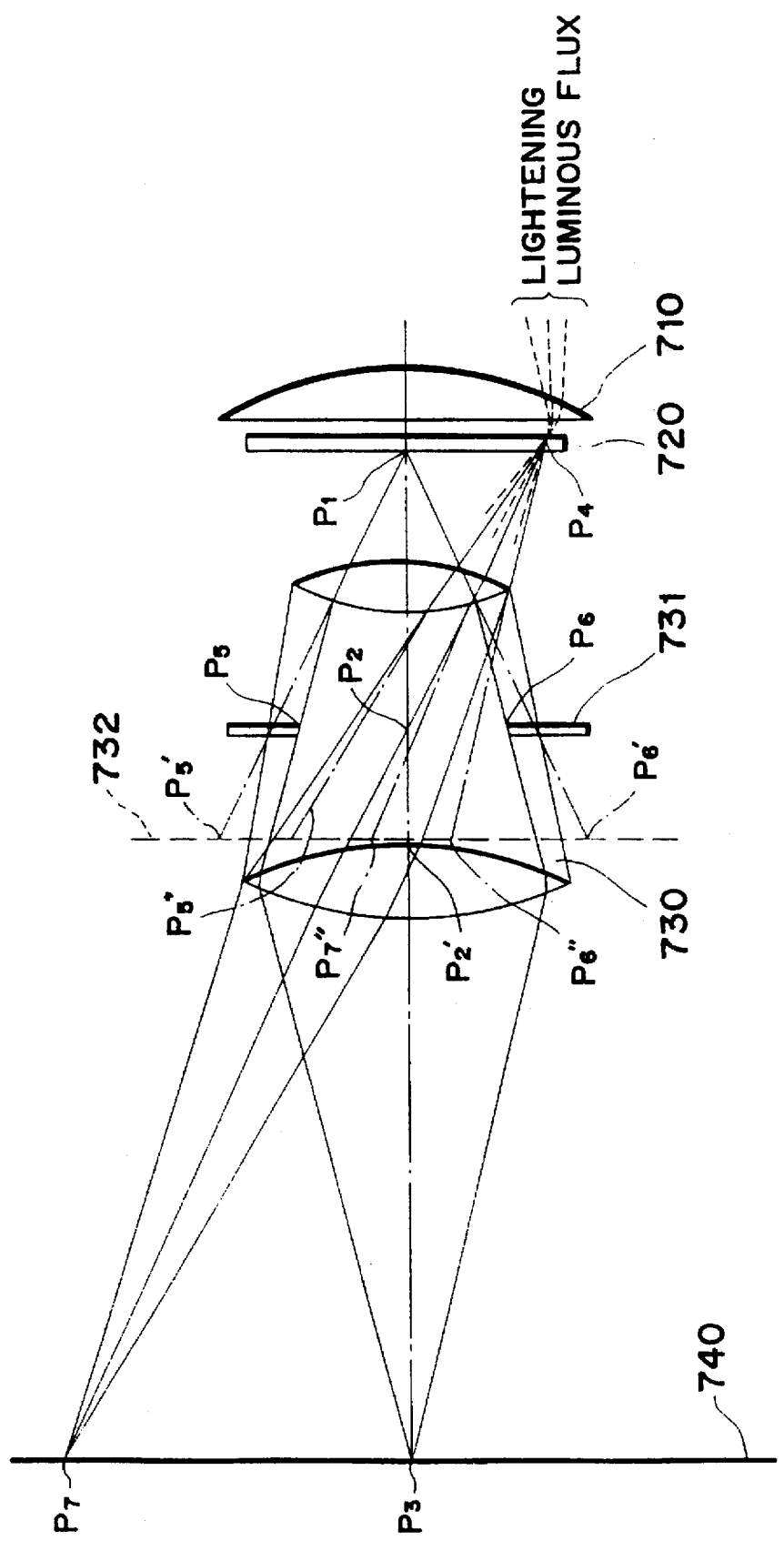
FIG. 7 is a view showing another example of the conventional projector.

In the following there will be explained another embodiment capable of attaining an increased luminance in the peripheral area of the displayed image, not only by the reduction of the spreading width D of the light beam but also by effectively utilizing the presence of plural high luminance areas in the light source, as shown in FIGS. 3 and 4.

Figure 2:
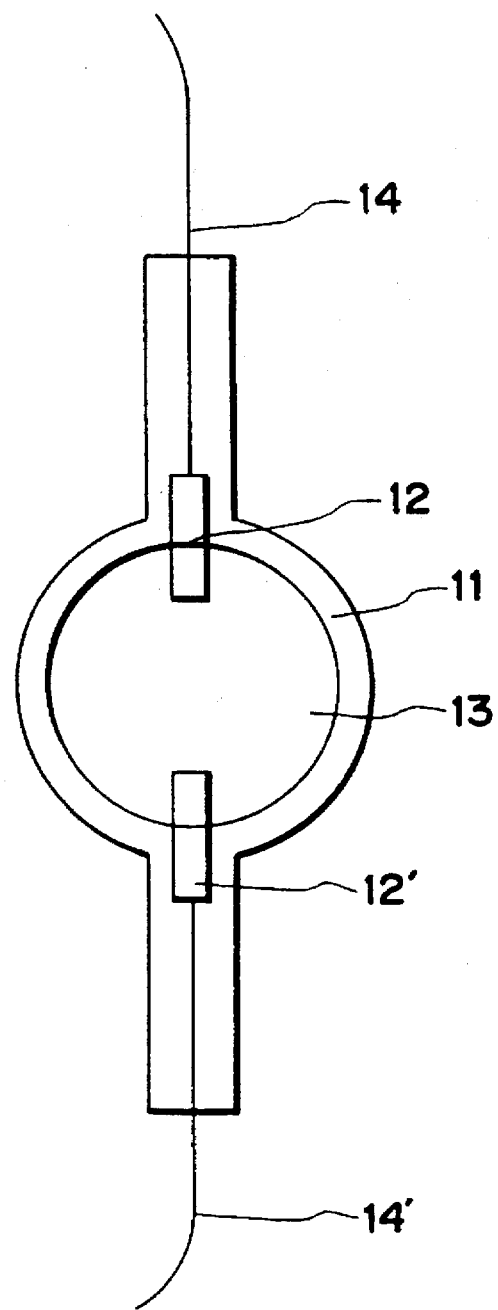
FIG. 2 is a view showing the structure of a metal halide lamp.
Figure 16:
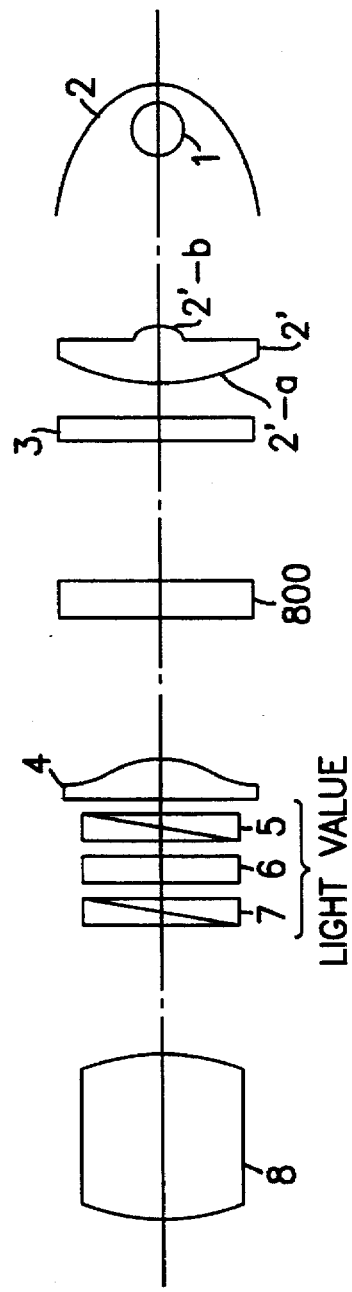
FIG. 16 is a view showing the configuration of an embodiment of the present invention.

FIG. 16 is a schematic view of the projector constituting said another embodiment of the present invention, wherein provided are a light source 1 consisting of a metal halide lamp shown in FIG. 2; a reflector 2 with a reflecting face of rotational parabolic shape; a condenser lens 2' of a composite shape to be explained later; a cut filter 3 for eliminating unnecessary ultraviolet and infrared lights; a color separator 800 for separating light into its color components; a condenser lens 4 for directing the illuminating light beam toward the entrance pupil of a projection lens 8; a liquid crystal display panel 6 composed for example of TN liquid crystal and an active matrix driving circuit; and polarizing plates 5, 7 serving as a polarizer and a detector. The liquid crystal panel 6 and the polarizing plates 5, 7 constitute a liquid crystal light valve in the known manner. The light beam transmitted by said light valve is projected in magnified manner by the projection lens 8 onto an unrepresented screen.

As shown in FIG. 3, the light source 1 has areas $\alpha$, $\alpha'$ of a very high luminance in the vicinity of the electrodes 12, 12', and is so positioned that said high luminance areas $\alpha$, $\alpha'$ are present on the optical axis of the optical system. The reflector has its focal point at a high luminance point $\alpha$ of the light source 1. The condenser lens 2' is provided, at the exit side thereof, with a curved surface 2'-a constituting a spherical or aspherical lens, having the focal point at the position of the liquid crystal panel, and, at the entrance side, with a flat face with a curved face 2'-b of a positive power at the central portion. The condenser lens 4, positioned close to the light valve, serves to direct the illuminating light beam, emerging from the condenser lens 2', toward the entrance pupil of the projection lens 8, thus principally functioning as a field lens.

In the above-explained configuration, an illuminating light beam of a high luminance is obtained through effective utilization of the high luminance areas $\alpha$, $\alpha'$ of the light source 1, by the combination of the reflector 2, condenser lenses 2', 4 as will be explained in detail in the following.

Figure 17:
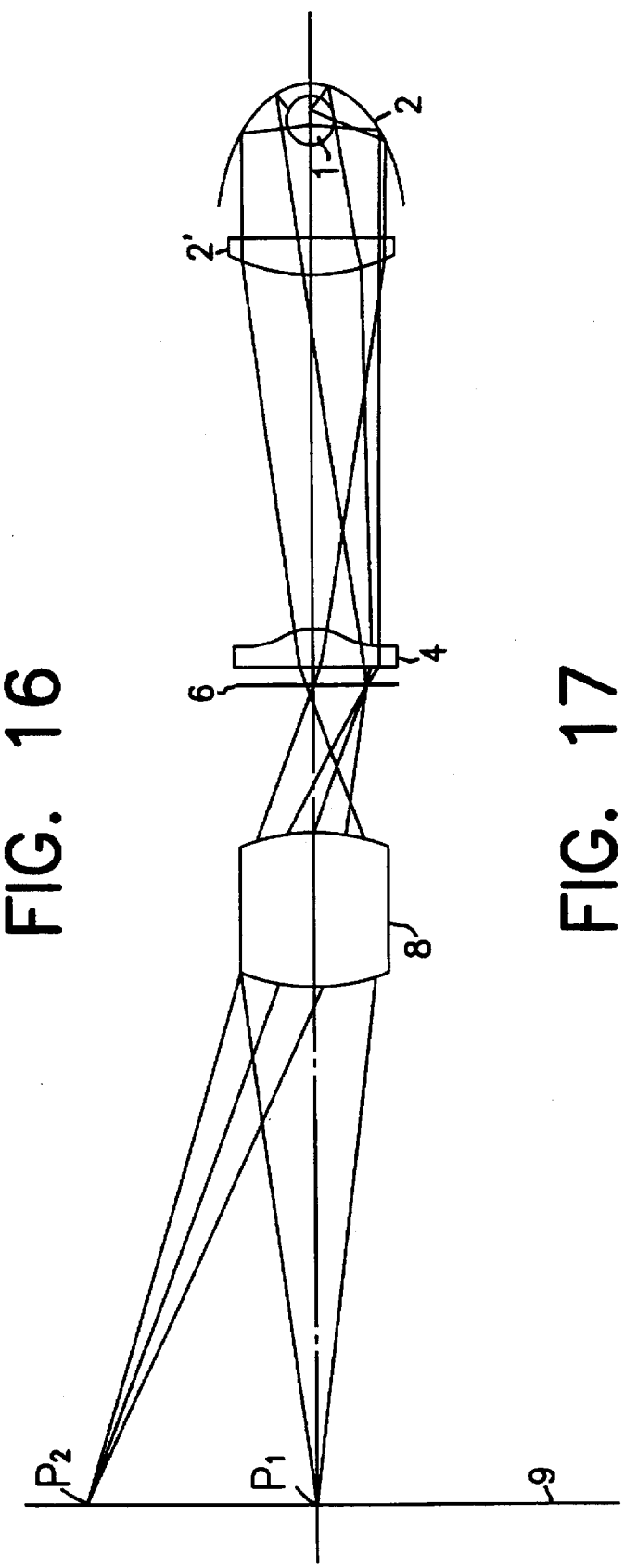
FIG. 17 is a view showing inversely traced rays in a reference example.
Figure 18:
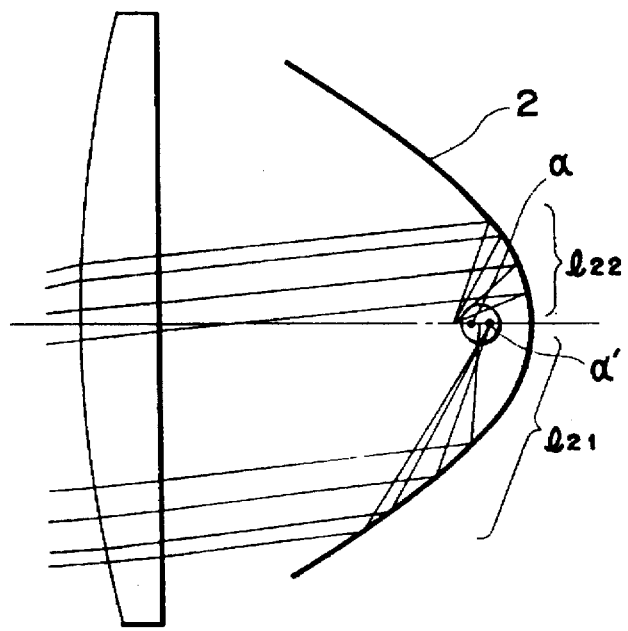
FIG. 18 is a view showing inversely traced rays in the vicinity of the light source in said reference example.

FIG. 17 shows the light condensing state, for the purpose of comparison, in a configuration in which the condenser lens 2' lacks the curved face of positive power at the entrance side but has the power only at the exit side. In FIG. 17 there is schematically illustrated the entire optical system, with the light beams inversely traced from the points on the screen 9, so as to fill the pupil of the projection lens 8. Also FIG. 18 shows the condensing state, in the vicinity of the light source 1, of the inversely traced rays from a point $P_2$ on the screen, in the meridional plane.

The inversely traced rays from the axial point $P_1$ on the screen substantially converge on the focal point of the reflector 2, as will be apparent from the definition of the shape of the reflector 2 and of the exit side face of the condenser lens 2'. Consequently an illuminating light beam of maximum luminance can be obtained on the axial point $P_1$ of the screen by placing the first high luminance area $\alpha$ of the light source 1 at the focal point of the reflector 2. On the other hand, for an off-axis point, the converging state is different between partial light beams $l_{21}$, $l_{22}$ shown in FIG. 18. More specifically, the partial beam $l_{21}$ converges in the vicinity of the high luminance area $\alpha'$ which is positioned closer to the bottom of the reflector 2 than the high luminance area $\alpha$, while the partial beam $l_{22}$ converges at a position closer, than the high luminance area $\alpha$, to the exit aperture of the reflector 2.

Figure 19:
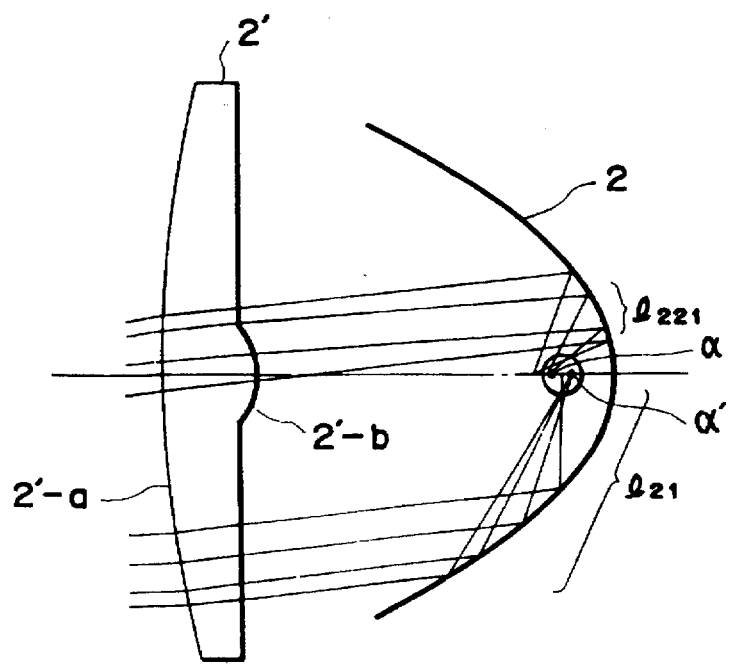
FIG. 19 is a view showing inversely traced rays in the vicinity of the light source, in an embodiment of the present invention.

The condenser lens 2' of the present embodiment is provided, as shown in FIG. 16, with the curved face 2'-b of a positive refractive power at the entrance side. FIG. 19 shows the condensing state, in the vicinity of the light source 1, of the inversely traced rays from the point $P_2$ on the screen.

A partial beam $l_{221}$ constituting a part of the partial beam $l_{22}$ is refracted by the curved face 2'-b and converges on the high luminance area $\alpha$ of the light source 1, thus corresponding to an illuminating light beam of a high luminance. On the other hand, the partial beam $l_{21}$, not passing through the curved part 2'-b of the entrance face of the condenser lens, still converges on the other high luminance area $\alpha'$ of the light source 1 as shown in FIG. 18.

Thus, as explained above, it is rendered possible to increase the high luminance area in the illuminating light beam, thereby elevating the illumination intensity on the image plane, by providing the condenser lens with a refracting area which acts only on a part of the rays not returning to the high luminance areas of the light source, among the inversely traced rays from the off-axis point $P_2$ of the screen.

In the present embodiment, among the inversely traced rays from the axial point $P_1$, a part enters the curved portion $2'-b$ of the entrance face of the condenser lens and is shifted to a position between the high luminance areas $\alpha$, $\alpha'$ of the light source 1, whereby a certain loss in the luminance should result. However, even in the conventional configuration, the rays close to the optical axis are not effectively utilized for illumination as they are intercepted by the bulb surface of the light source 1 or the lamp holder at the bottom of the reflector as shown in FIG. 2, so that there is almost no practical loss in the illumination intensity on the axial point $P_1$, resulting from the addition of the curved portion $2'-b$. Preferably the size and shape of the curved area $2'-b$ are determined in consideration of the bulb size etc. of the light source 1.

The foregoing explanation has been concentrated on the axial point $P_1$ and the off-axis point $P_2$ (or a corresponding annular area), but other off-axis points or corresponding annular areas are illuminated principally by the light beam coming from an intermediate area between the high luminance areas $\alpha$, $\alpha'$ of the light source 1. Therefore, for attaining uniform illumination intensity in more effective manner over the entire screen, the system is preferably designed in such a manner that the aforementioned point corresponding to $P_2$ is positioned in the vicinity of an off-axis point where an abrupt loss in the illumination intensity occurs in the conventional system.

The condenser lens 4 in FIG. 16, serving to effectively direct the illuminating light beam, arriving at any arbitrary point on the liquid crystal panel 6, toward the entrance pupil of the projection lens 8, may be composed not only of a spherical single lens but also of an aspherical lens or a lens group consisting of the combination of plural lenses. Also preferred is the use of a lens capable of the spreading and D of light beam, as already explained in relation to FIGS. 8 to 15.

The condenser lens 4 may be composed of a plastic lens, such as of acrylic resin. Also the condenser lens $2'$ may include an aspherical face or may be composed of a lens group, if necessary or preferable. Essential factors are to illuminate the central area of the illuminated object by the light beam from the first high luminance area of the light source and to illuminate the peripheral area of said object by the light beam coming from both the first and second high luminance areas of the light source, or, in terms of the inversely traced light beam, to separate it into light beams $l_{21}$ and $l_{22}$ by means of the condenser lens 4 and to guide a partial beam $l_{221}$ of the beam $l_{22}$ to the high luminance light emitting area $\alpha$ by means of the condenser lens $2'$.

Figure 20:
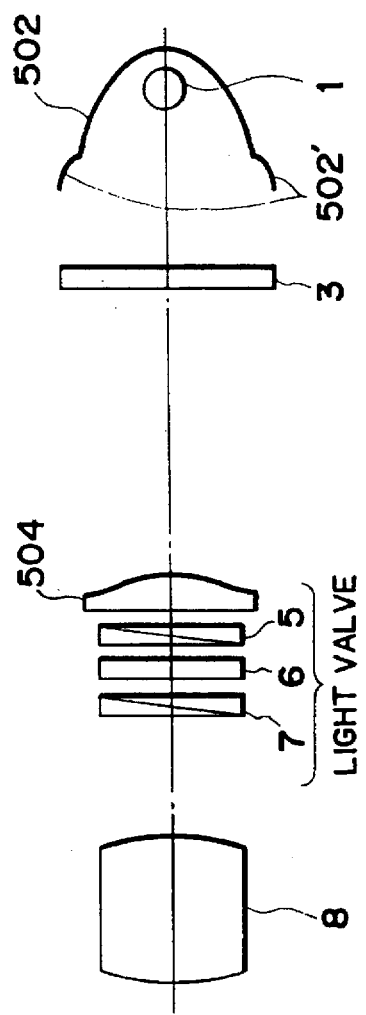
FIG. 20 is a view showing the configuration of the optical system of another embodiment of the present invention.

FIG. 20 is a schematic view of the projector constituting another embodiment of the present invention, wherein same components as those in FIG. 16 are represented by same numbers.

In this embodiment, reflectors 502, 502' have rotational elliptical or similar reflecting faces of mutually different focal points. The reflector 502 has a first focal point at a high luminance area $\alpha$ of the light source 1, a second focal point on the axial point of the liquid crystal panel 6. On the other hand, the reflector 502' has a focal point at a position on the optical axis, closer to the exit aperture of the reflector 502 than the first focal point thereof. A condenser lens 504 serves to direct the illuminating light beam, emerging from the reflectors 502, 502', toward the entrance pupil of the projection lens 8, thus principally functioning as a field lens.

In the above-explained configuration, an illuminating light beam of a high luminance is obtained through effective utilization of the high luminance areas $\alpha$, $\alpha'$ of the light source 1, by the combination of the reflectors 502, 502' and the condenser lens 504 as will be explained in detail in the following.

Figure 21:
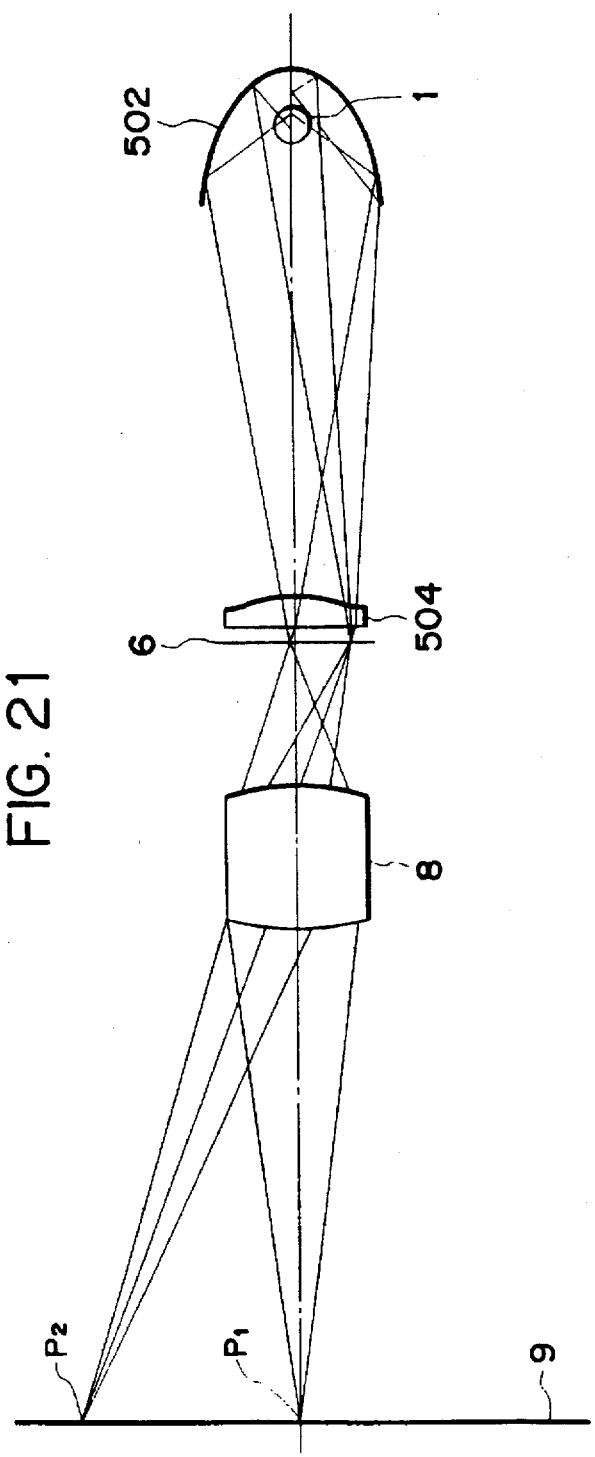
FIG. 21 is a view showing inversely traced rays in a reference example.
Figure 22:
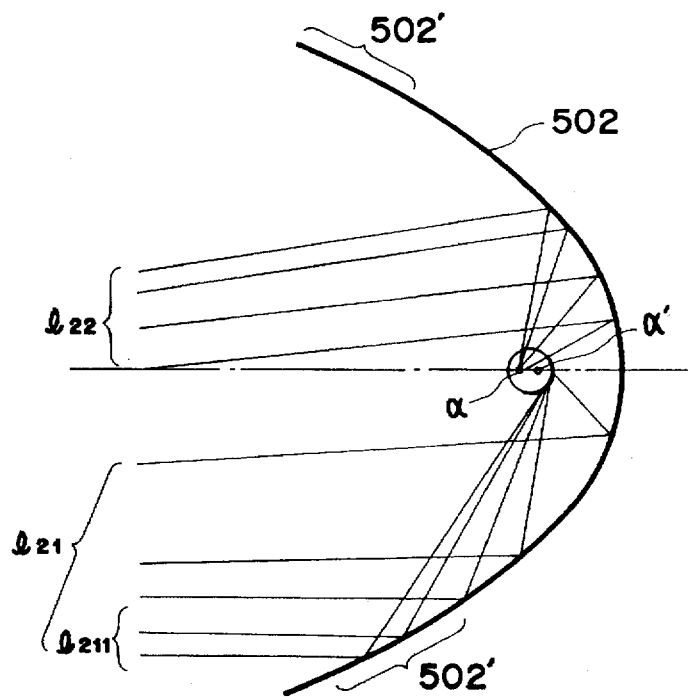
FIG. 22 is a view showing inversely traced rays in the vicinity of the light source in said reference example.

FIG. 21 shows the light condensing state, for the purpose of comparison, in case the rotational elliptical face of the reflector 502 is extended to the area of the reflector 502'. In FIG. 21 there is schematically illustrated the entire optical system, with the light beams inversely traced from the points on the screen 9, so as to fill the pupil of the projection lens 8. Also FIG. 22 shows the condensing state, in the vicinity of the light source 1, of the inversely traced rays from a point $P_2$ on the screen, in the meridional plane.

The inversely traced rays from the axial point $P_1$ of the screen converge on the first focal point of the reflector 502, as will be apparent from the definition of the shape thereof. Consequently an illuminating light beam of maximum luminance can be obtained at the axial point $P_1$ of the screen, by placing the first high luminance area $\alpha'$ of the light source 1 at the first focal point of the reflector 502. On the other hand, for an off-axis point, the converging state is different between partial light beams $l_{21}$, $l_{22}$ shown in FIG. 22. More specifically, the partial beam $l_{22}$ converges in the vicinity of the high luminance area $\alpha$ positioned closer than the area $\alpha'$ to the exit aperture of the reflector, while the partial beam $l_{21}$ converges at a position closer, than the high luminance area $\alpha'$, to the bottom of the reflector 502

Figure 23:
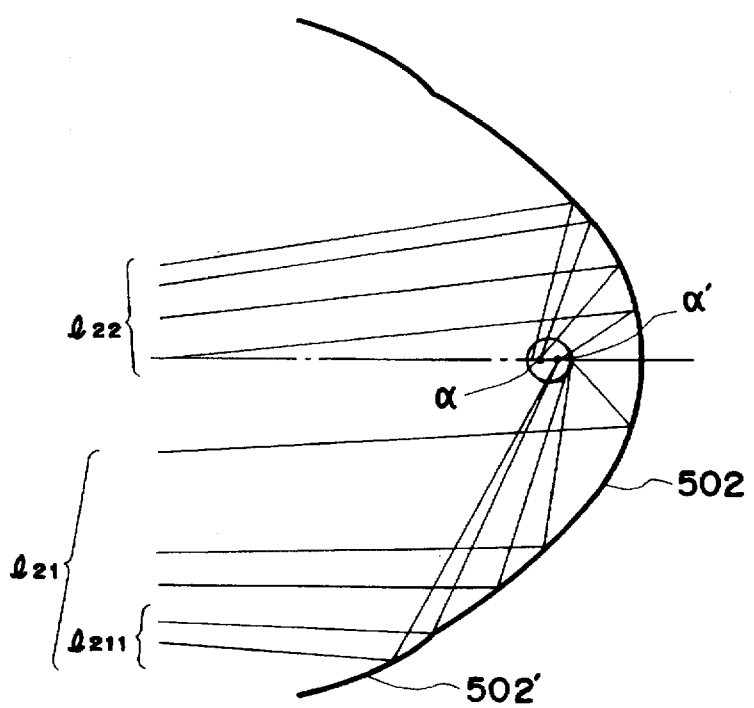
FIG. 23 is a view showing inversely traced rays in the vicinity of the light source in another embodiment of the present invention.

The reflector in the present embodiment is composed, as shown in FIG. 20, of a reflector 502 and an outer reflector 502' of which focal point is positioned closer to the exit aperture of said reflectors than the focal point of said reflector 502, and FIG. 23 shows the converging state, in the vicinity of the light source 1, of rays inversely traced from a point $P_2$ on the screen.

A partial light beam $l_{211}$ of the inversely traced beam $l_{21}$ proceeding toward the deeper part, than the high luminance area $a'$ of the light source 1, of the reflector converges on said high luminance area $\alpha$ by the function of the reflector 502'. Consequently the illumination intensity of the light beam arriving at the off-axis point $P_2$ is increased. The reflector 502' does not affect the axial light beam, since the light beam inversely traced from the axial point $P_1$ does not reach said reflector 502'.

Thus, the luminance of the off-axis light beam can be elevated by placing the reflector 502', of which focal point is positioned closer to the exit aperture of the reflectors than the focal point of the reflector 502, in such an area that is not reached by the inversely traced light beam from the axial point $P_1$.

Figure 24:
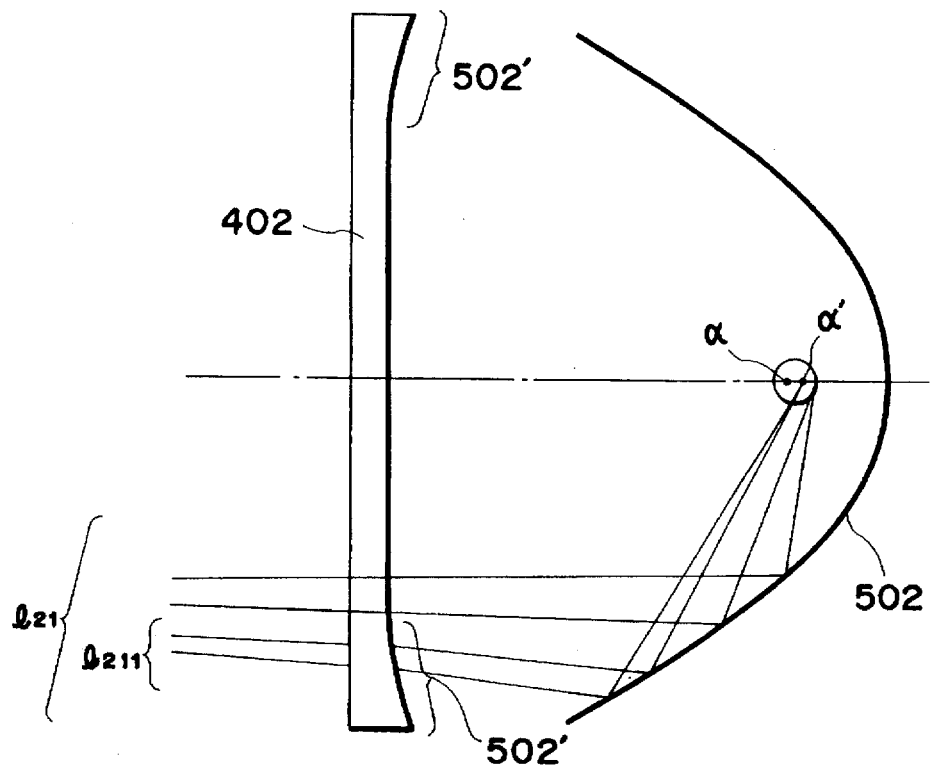
FIG. 24 is a view showing inversely traced rays in the vicinity of the light source in a variation of said another embodiment of the present invention.
Figure 25:
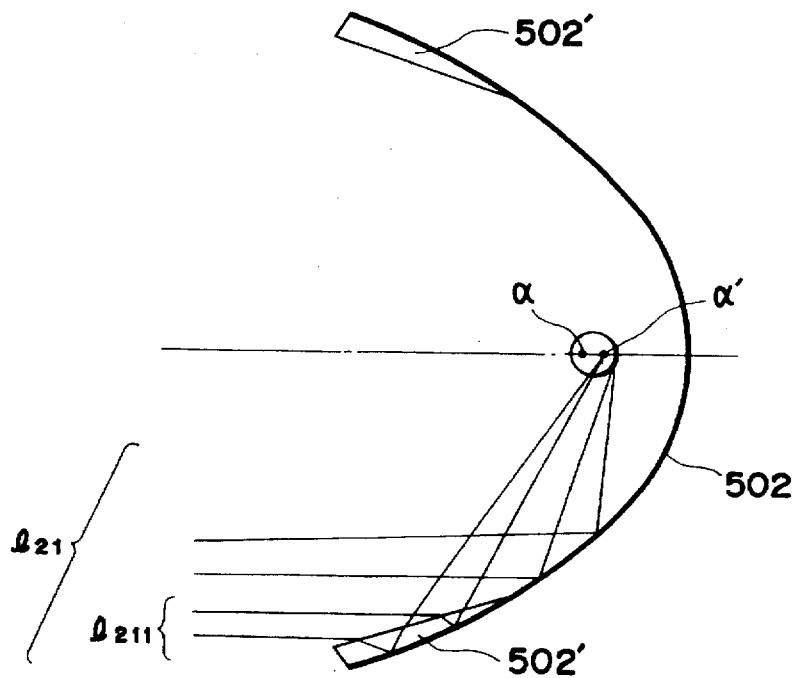
FIG. 25 is a view showing inversely traced rays in the vicinity of the light source in another variation of said another embodiment of the present invention.

FIGS. 24 and 25 illustrate variations of the optical element equivalent in function to that of the foregoing embodiment. In FIG. 24, the reflector 502' in FIG. 23 is replaced by an extension of the reflector 502, and a condenser lens 402 having a negative power in a peripheral part 502' thereof is added at the exit aperture side, whereby a part $l_{211}$ of the light beam $l_{21}$ converges on the high luminance area $\alpha'$ of the light source 1, and the luminance of the off-axis beam $P_2$ can therefore be elevated.

In FIG. 25, the reflector 502' in FIG. 23 is replaced by an extension of the reflector 502, and a refractive element 502' is attached to the periphery thereof at the exit aperture, with increasing thickness toward said periphery, whereby a part $l_{211}$ of the beam $l_{21}$ converges on the high luminance area $\alpha'$ of the light source 1 and the luminance of the off-axis beam $P_2$ can therefore be elevated.

The embodiments shown in FIGS. 20 to 25 are based on a rotationally elliptical reflector, but it is still possible to add an optical element similar in function, when the optical system is based on the combination of a rotational parabolic or spherical reflector and a condenser lens. Furthermore there may also be employed reflectors with curved faces close to rotational parabolic or elliptical faces or other rotational aspherical faces.

Also the condenser lens 504 shown in FIG. 20 may contain an aspherical face or may be replaced by a lens group, if necessary or desirable. Also a plastic lens for example of acrylic resin may be employed for this purpose.

The embodiments shown in FIGS. 16 to 25 constitute a critical illuminating system, in which, for an axial point, a high luminance area $\alpha$ of the light source 1 is conjugate with the center of the illuminated object, and, for an off-axis point, both high luminance areas $\alpha$, $\alpha'$ of the light source 1 are conjugate with the peripheral area of the object. In practice, however, critical illumination is not attained in strict sense, since the off-axis point is illuminated not only by the high luminance areas $\alpha$, $\alpha'$ of the light source 1 but also by the light emitting areas in the vicinity because of the remaining aberrations if sagittal rays etc. are considered.

However the above-mentioned conjugate relationships are not the essential condition of the present invention. For example, in the embodiment shown in FIG. 16, the focal point at the exit side 2'-a of the condenser lens 2' may be displaced from the liquid crystal panel 6, and, in the embodiment shown in FIG. 20, the second focal point of the reflector 502 may be displaced from the liquid crystal panel 6. In such case Kehler illumination is attained both in the axial and off-axis points.

Also, in the embodiments shown in FIGS. 16 and 20, the reflector is composed respectively of a rotational parabolic surface and a rotational elliptic surface, but the concept of the present invention is applicable to any illuminating system that provides two converging areas in the vicinity of the light source, for the inversely traced light beam from an off-axis point. In such case it is necessary to attach a condenser lens or lenses in suitable manner.

It is also necessary to select the structure and size of the illuminating system, the distance of electrodes of the light source, and the condenser lenses 4, 504, in such a manner that the distance of two high luminance areas of the light source matches the positions of the converging points for the axial 1 and off-axis light beams.

Figure 26:
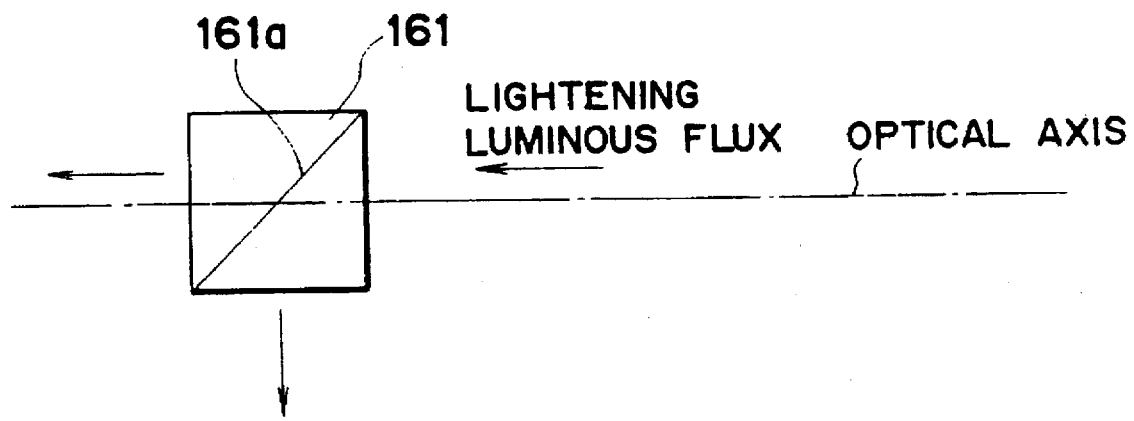
FIG. 26 is a view of an optical element in another embodiment of the present invention.

In the following there will be explained another embodiment of the projector, in which an optical element shown in FIG. 26 is inserted in an arbitrary position between the reflector 2 and the liquid crystal panel in the embodiment shown in FIG. 16 or in an arbitrary position between the reflector 502 and the liquid crystal panel in the embodiment shown in FIG. 20. In FIG. 26, there is shown a polarizing beam splitter 261 including therein an optical multi-layered film 161a.

In this embodiment, in consideration of a fact that the unnecessary light separated by the polarizing beam splitter is converted into heat, said polarizing beam splitter is preferably separated as far as possible from the liquid crystal panel, and is positioned, for example close to the exit of the reflector.

The illuminating light beam emerging from the reflector is separated by the polarizing beam splitter 161 into mutually perpendicular polarized light components, and one of said components is directed toward the liquid crystal panel 6. Thus said element serves to generate polarized light prior to the entry into the polarizing plate 5, thereby preventing heat generation therein. In the present embodiment, the polarizing plate 5 may be dispensed with, but the presence thereof allows to further increase the polarizing ratio of the polarized light.

The polarizing direction of the illuminating light beam emerging from the polarizing beam splitter has to match that of the polarizing plate, and a wavelength displacing plate may be inserted in suitable manner.

As explained in the foregoing, the above-explained embodiments allow to increase the luminance, in the projected magnified image, particularly in the peripheral area where the loss in luminance is marked. It is also possible, utilizing the luminance distribution of the light source, to increase the luminance of the light beam illuminating the off-axis point (peripheral area) of the projected image, without sacrificing the luminance of the light beam illuminating the axial point (central area) of the image.

In the following there will be explained an embodiment of the projector, capable of improving the resolving power in the peripheral area of the image, in comparison with that in the conventional configuration, thereby displaying an image of a high resolving power both in the central and peripheral areas.

Figure 27:
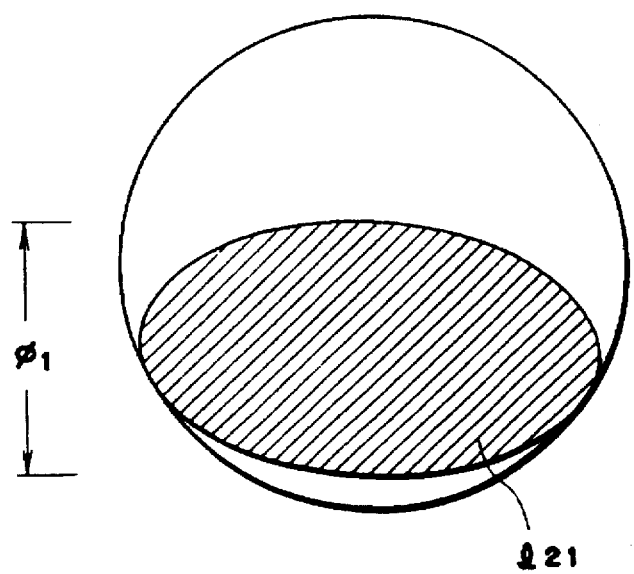
FIG. 27 is a view showing the image of the light source on the pupil plane in a conventional configuration.

FIG. 27 shows a light source image on the entrance pupil of the projection lens 730, shown in FIG. 4, corresponding to the inversely traced light beam from the off-axis point $p_7$ on the screen 740. The entrance pupil seen from an off-axis point is generally non-circular because of vignetting by an end of the projection lens, but it is shown circularly for the purpose of simplicity. In FIG. 27, a hatched area indicates an area filled with the light beam from the aforementioned light luminance area $\alpha$ or $\alpha'$. As will be apparent from FIG. 27, the light beam illuminating the peripheral area of the screen 740 does not effectively utilize the entrance pupil, so that the effective F-number becomes larger and leads to the following drawback.

In general, the diameter 2r of the airy disk constituted by an imaging system of an effective F-number F is represented by:

$$2r=2.44F\lambda$$

wherein $\lambda$ is the wavelength. Consequently the resolving power of the imaging system becomes lower with the increase of the effective F-number. In case of a liquid crystal projector, the length of a side or a pixel is about 10 μm or less in order to reproduce 2 million pixels, required in the high definition television, in a liquid crystal light valve of a diagonal of 1 inch or less. For a condition of F=4.5 and $\lambda$=0.5 μm, the size of the airy disk becomes about 2.5 μm, close to the pixel size. Consequently, if the effective F-number becomes large due to the underutilization of the effective pupil for the peripheral light beam as shown in FIG. 27, there cannot be obtained an illuminating optical system of a resolving power corresponding to the pixel size of 10 μm or less.

Such situation is same also in the ordinary slide projector. Since the current high density slid film has a resolving power in the order of a micron, the conventional illuminating optical system deteriorates the resolving power in the peripheral area of the projected image, which therefore becomes unpleasant to observe.

Figure 28:
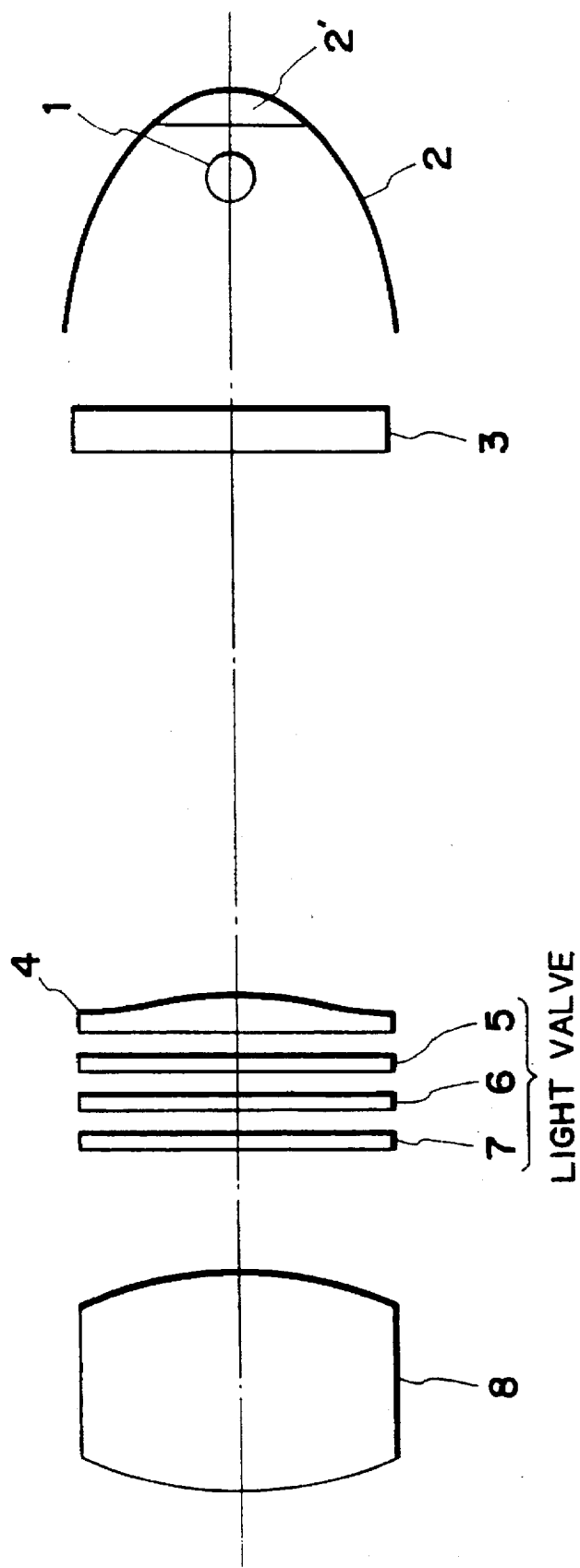
FIG. 28 is a schematic view showing the configuration of an embodiment of the present invention.

FIG. 28 is a schematic view of another embodiment of the present invention, wherein provided are a light source 1 consisting of a metal halide lamp shown in FIG. 2; a reflector 2 with a reflecting face of a rotational parabolic shape; an optical element 2' consisting in the present embodiment of a lens of a shape to be explained later; a cut filter 3 for eliminating unnecessary ultraviolet and infrared lights; a condenser lens 4 for directing the illuminating light beam toward the entrance pupil of a projection lens 8; a liquid crystal display panel 6 composed for example of TN liquid crystal and an active matrix driving circuit; and polarizing plates 5, 7 serving as a polarizer and a detector. The liquid crystal panel 6 and the polarizing plates 5, 7 constitute a liquid crystal light valve in the known manner. The light beam transmitted by said light valve is projected in magnified manner by the projection lens 8 onto an unrepresented screen.

As shown in FIG. 3, the light source 1 has areas α, α' of a very high luminance in the vicinity of the electrodes 12, 12', and is so positioned that said high luminance areas α, α' are present on the optical axis of the optical system. The reflector 2 has its focal point at a high luminance point α of the light source 1. At the side of said reflector, the lens 2' has a face of a shape substantially same as that of said reflector, positioned close thereto, and has a spherical or aspherical face at the side of the light source 1, so that said lens 2' has a positive refractive power.

The condenser lens 4, positioned close to the light valve, serves to direct the illuminating light beam toward the entrance pupil of the projection lens 8, thus functioning principally as a field lens.

In the above-explained configuration, an illuminating light beam with an improved resolving power particular for an off-axis ray is obtained through effective utilization of the high luminance areas α, α' of the light source 1, by the combination of the reflector 2, lens 2' and condenser lens 4 as will be explained in detail in the following.

Figure 29:
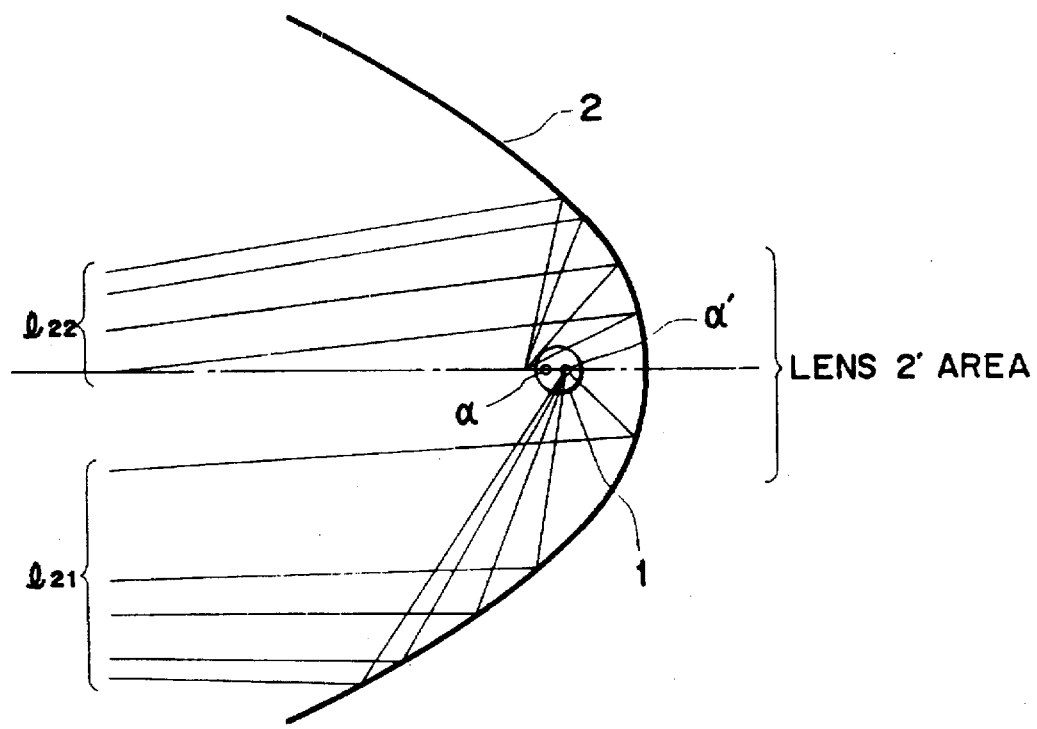
FIG. 29 is a view showing inversely traced rays in the vicinity of the light source in a reference example.

FIG. 29 shows a reference example for clarifying the effect of the present invention, and illustrates the converging state, in the vicinity of the light source 1, of the inversely traced rays from an off-axis point on the screen, in the meridional plane. The rays inversely traced from the axial point on the screen converge on the first focal point of the reflector 2, constituting the high luminance area α, as will be apparent from the foregoing definition of the shape of the reflector 2. Consequently the pupil of the projection lens 8 can be fully utilized for such rays, and a sufficient resolving power can be obtained at the center of the screen.

On the other hand, for an off-axis point, the converging state is different between partial light beams $l_{21}$, $l_{22}$. The partial light beam $l_{21}$ converges in the vicinity of the high luminance area α', positioned closer to the bottom of the reflector 2 than the high luminance area α, while the partial beam $l_{22}$ converges at a point closer to the exit aperture of the reflector 2 than the high luminance area α. This indicates that, for an off-axis point, the pupil of the projection lens 8 is only partly filled by the illuminating light beam from the light source.

Figure 30:
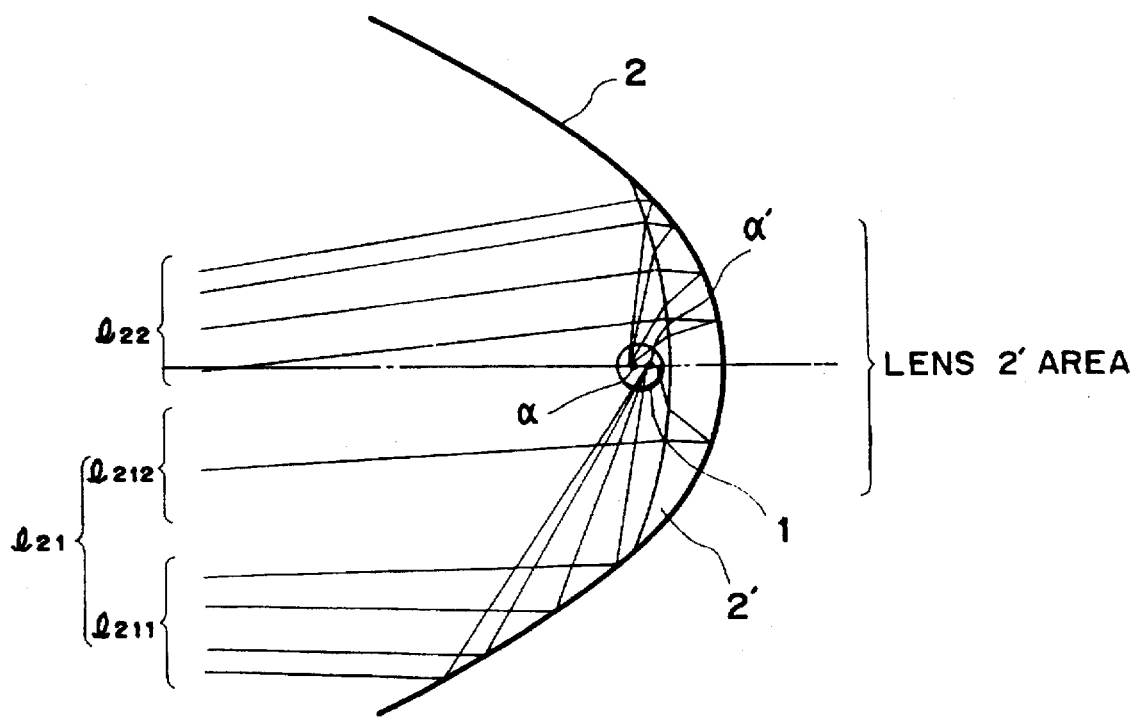
FIG. 30 is a view showing inversely traced rays in the vicinity of the light source in an embodiment of the present invention.

The reflector 2 in the present embodiment is provided with a lens 2' of a positive power close to the bottom of the reflector 2 as shown in FIG. 28, and the converging state, in the vicinity of the light source 1, of the rays inversely traced from an off-axis point on the screen is shown in FIG. 30.

A partial light beam $l_{22}$ converges on the high luminance area α of the light source 1 by means of the lens 2' and the reflector 2, so that the partial beam $l_{22}$ corresponds to an illuminating light beam of a high luminance. On the other hand, among the partial light beam $l_{21}$, a partial beam $l_{211}$ reflected by the reflector 2 converges to the other high luminance point α' of the light source 1 as shown in FIG. 29, while a partial beam $l_{212}$ reflected by the reflector 2 through lens 2' is shifted from the high luminance area α' of the light source 1 toward the bottom side of the reflector and does not pass through the light emitting part of the light source 1. Also among the light beam inversely traced from the axial point on the screen, a partial beam passing through the lens 2' converges in the intermediate part of the high luminance areas α, α' of the light source 1.

Figure 31:
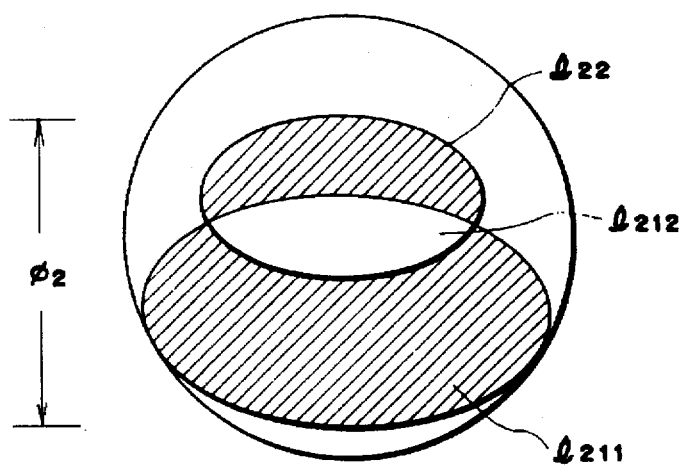
FIG. 31 is a view of the image of the light source on the pupil plane in an embodiment of the present invention.

FIG. 31 shows the converging state of the light by the addition of the above-mentioned lens 2', as a light source image on the entrance pupil of the projection lens 8.

FIG. 31 is the light source image when the lens 2' shown in FIG. 30 is added, wherein hatched areas $l_{22}$, $l_{211}$ and a non-hatched area $l_{212}$ respectively correspond to the light beams $l_{22}$, $l_{211}$, $l_{212}$. The inversely traced light beam corresponding to the light beam $l_{212}$ within the light beam $l_{21}$ is displaced from the light emitting areas of the light source 1, and the area of an inversly traced light beam corresponding to a part of the light beam $l_{22}$ is instead filled by the light beam from the light source 1. As will be understood from the comparison of FIG. 31 with FIG. 27 showing a reference example, the area of the light source image on the entrance pupil of the projection lens 8 is almost same, but the diameter of the light source image in the meridional plane is larger, so that the effective F-number becomes smaller for the off-axis beams.

In the present embodiment, the lens 2' is so designed as to cover an area corresponding to the light beam $l_{22}$ in the meridional plane, but the effect of the present embodiment is not lost even if said lens 2' does not precisely cover said area.

Also in the present embodiment, among the inversely traced beam from the axial point $P_3$ shown in FIG. 4, a part in the vicinity of the optical axis of the reflector 2 is transmitted by refracted by the lens 2', thereby converging an interim position between the high luminance areas α, α' instead of converging on the high luminance area α, whereby a certain loss in the luminance should result. In practice, however, almost no light is emitted from the light source 1 in the axial direction, because of the presence of a lamp holder at the bulb surface or at the bottom of the reflector as shown in FIG. 2. Consequently, the luminance loss in the axial light beam, resulting from the presence of the lens 2', is negligible. Preferably the size and shape of the lens 2' are determined in consideration of the bulb size etc. of the light source 1.

The condenser lens 4 in FIG. 28, serving to effectively direct the illuminating light beam, arriving at any arbitrary point on the liquid crystal panel 6, toward the entrance pupil of the projection lens 8, may be composed not only of a spherical signal lens but also of an aspherical lens or a lens group consisting of the combination of plural lenses. Also there may be employed a plastic lens composed for example of acrylic resin. Essential factors are to illuminate the central area of the illuminated object by the light beam from the first high luminance area of the light source and to illuminate the peripheral area of said object by the light beam coming from both the first and second high luminance areas of the light source, or, in terms of the inversely traced light beam, to separate it into light beams $l_{21}$ and $l_{22}$ by means of the condenser lens 4 and to guide a part of the light beam $l_{22}$ to the high luminance area α by means of the lens 2'.

Figure 32:
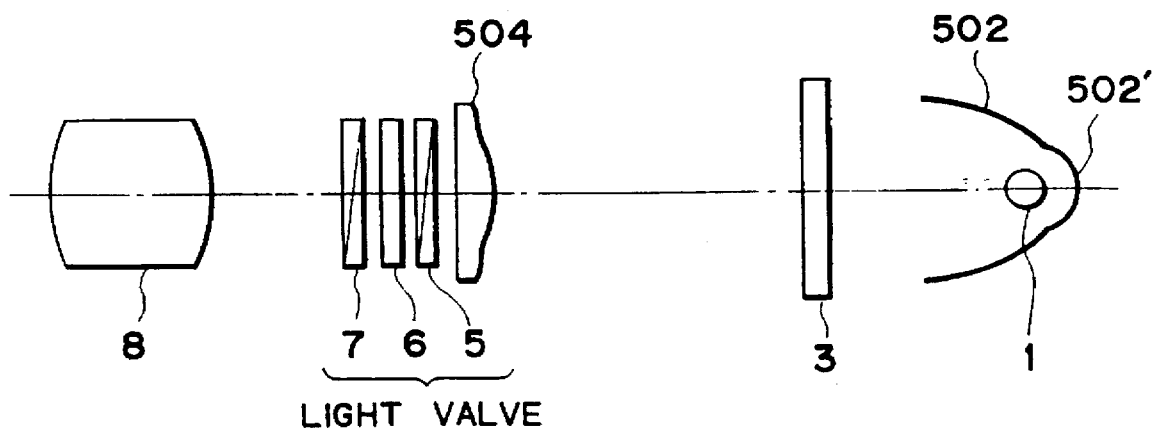
FIG. 32 is a schematic view of another embodiment of the present invention.

FIG. 32 is a schematic view of a projector, constituting another embodiment of the present invention.

In the present embodiment, the reflector is composed of reflecting faces 502, 502' of two rotational elliptical or similar shapes of mutually different focal points, wherein the reflecting face 502' constitutes the optical element of the present invention. The reflector 502 has a first focal point at a high luminance area α of the light source, and a second focal point at the axial point of the liquid crystal panel 6. On the other hand, the reflector 502' is composed of a rotational elliptical or similar face having a focal point on the optical axis opposite to the exit aperture of the reflector 502, with respect to the first focal point thereof. A condenser lens 504 serves to direct the illuminating light beam, emerging from the reflectors 502, 502', toward the entrance pupil of the projection lens 8, thus principally functioning as a field lens.

In the above-explained configuration, an illuminating light beam of an improved resolving power particularly for the off-axis rays is obtained through effective utilization of the high luminance areas $\alpha$, $\alpha'$ of the light source 1, by the combination of the reflectors 502, 502' and the condenser lens 504, as will be explained in detail as follows.

Figure 33:
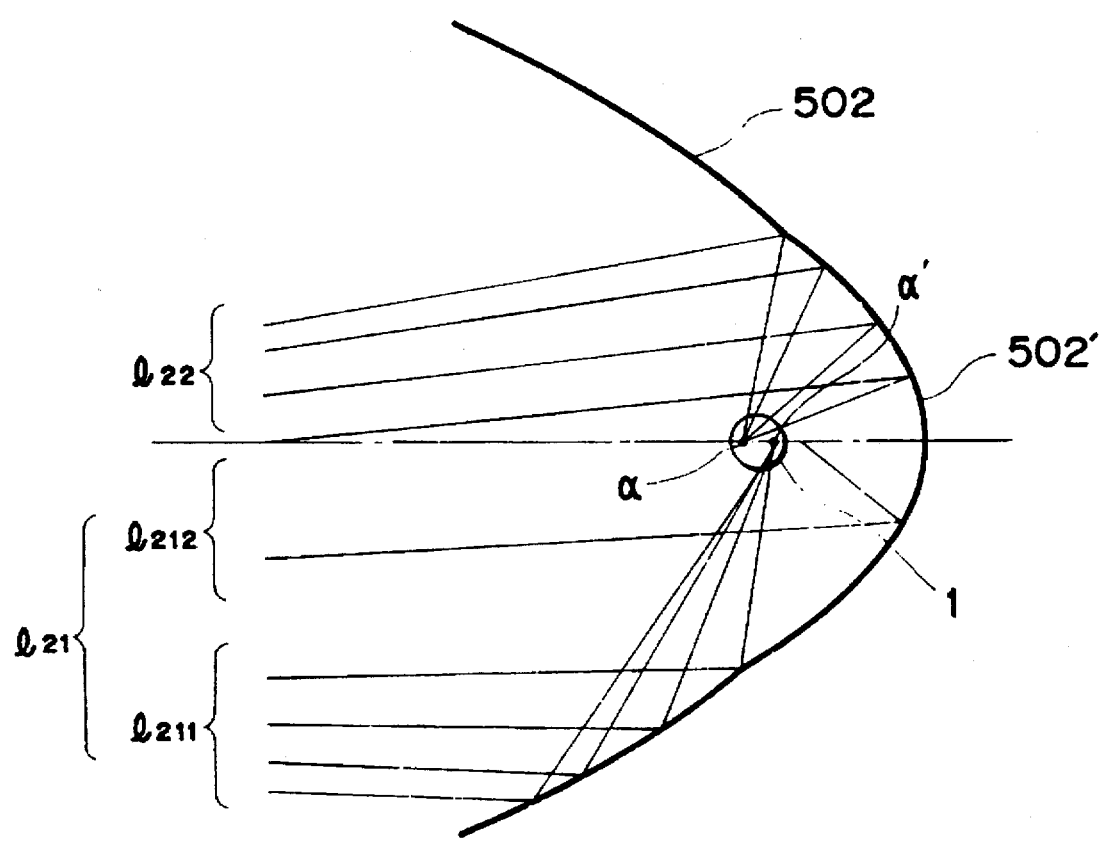
FIG. 33 is a view showing inversely traced rays in the vicinity of the light source in another embodiment of the present invention.

In the present embodiment, as shown in FIG. 32, there is provided, in the vicinity of the optical axis of the reflector 502, with a reflector 502' of which focal point is positioned closer to the bottom of said reflector 502, than the focal point thereof, and FIG. 33 shows the converging state, in the vicinity of the light source 1, of the inversely traced rays from an off-axis point on the screen.

A partial light beam $l_{22}$ converges on the high luminance area $\alpha$ of the light source 1 by means of the reflector 502', so that an illuminating light beam of a high luminance is obtained corresponding to the partial light beam $l_{22}$. On the other hand, among the partial light beam $l_{21}$, a beam $l_{211}$ reflected by the reflector 502 still converges on the other high luminance area $\alpha'$ of the light source 1, as in FIG. 29. On the other hand, a beam $l_{212}$ reflected by the reflector 502' is shifted from the high luminance area $\alpha'$ toward the bottom of the reflector and does not return to the light emitting areas of the light source 1.

Consequently the light source image formed on the entrance pupil of the projection lens becomes similar to that shown in FIG. 31.

The condenser lens 504 of the present embodiment, as in other embodiments, may contain an aspherical face or may be replaced by a lens group. Also there may be employed a plastic lens composed for example of acrylic resin.

The embodiments shown in FIGS. 30 and 33 constitute a critical illuminating system, in which, for an axial point, a high luminance area $\alpha$ of the light source 1 is conjugate with the center of the illuminated object, and, for an off-axis point, both high luminance areas $\alpha$, $\alpha'$ of the light source 1 are conjugate with the peripheral area of the object. In practice, however, critical illumination is not attained in strict sense, since the off-axis point is illuminated not only by the high luminance areas $\alpha$, $\alpha'$ of the light source 1 but also by the light emitting areas in the vicinity because of remaining aberrations if sagittal rays etc. are considered. Such conjugate relationship are not the essential condition of the present invention. For example, if the focal point of the reflector 2 is displaced from the liquid crystal panel 6, Kehler illumination is attained both in the axial and off-axis points.

Also in the embodiments shown in FIGS. 30 and 33, the reflector is composed of a rotational elliptical face, but the concept of the present invention is applicable to any illuminating system such as a parabolic reflector, a spherical reflector or a reflector of a similar aspherical shape, that provides two converging areas in the vicinity of the light source, for the inversely traced light beam from an off-axis point. In such case it is necessary to add a condenser lens or lenses in suitable manner.

It is also important to select the structure and size of the illuminating system, and the distance of electrodes of the light source in such a manner that the distance of two high luminance areas of the light source matches the positions of the converging points for the axial and off-axis light beams. However, since the minimum requirement of the present invention is that the peripheral area of the illuminated object is illuminated by the light coming from the first high luminance area through the reflector and by the light coming from the second high luminance area through the optical element, the high-luminance light emitting area is not necessarily positioned at the focal point of the reflector.

The foregoing embodiments have been limited to a projector employing a transmissive liquid crystal device, but the present invention is likewise applicable to a projector employing a reflective liquid crystal device, a slide projector or a liquid crystal projector for color image display. It is naturally applicable also to other optical apparatus in which an object is illuminated and an optical image (object information) obtained by said illumination is magnified for observation.

As detailedly explained in the foregoing, the present invention provides an optical apparatus capable of displaying an image of a high resolving power and a high luminance over the entire image frame.

What is claimed is:

1. A projector comprising:
   a light source having first and second high-luminance light emitting areas;
   an illuminating optical system for directing light, from said light source, toward an object to be illuminated, wherein said first and second high-luminance light-emitting areas are positioned on an optical axis of said illuminating optical system; and
   a projection optical system for projecting the light emerging from said illuminated object;
   wherein said illuminating optical system is constructed in such a manner that multiple rays of light emitted from a point in said first high-luminance light-emitting area are imaged on a central area of said illuminated object such that said multiple rays of light converge at one point in said central area and that multiple rays of light emitted from respective points in each of said first and second high-luminance light-emitting areas are imaged on a peripheral area of said illuminated object such that said multiple rays of light emitted from said respective points in each of said first and second high-luminance light-emitting areas converge at points in said peripheral central area.

2. A projector according to claim 1, wherein said illuminating optical system includes:
   a reflector for reflecting the light from said light source; and
   a refractive element provided at the peripheral area at the aperture side of said reflector.

3. A projector according to claim 1, wherein said illuminating optical system is constructed in such a manner that said first high-luminance light-emitting area is imaged on the central area of said illuminated object and that said first and second high-luminance light-emitting areas are imaged on the peripheral area of said illuminated object.

4. A projector according to claim 1, wherein said illuminated object is composed of a light valve composed of TN liquid crystal capable of forming an image by modulating the light, and said illuminating optical system includes a polarizing beam splitter for separating the light, prior to the entry into said light valve, into polarized lights of mutually different polarizing directions and directing one of said polarized lights towards said light valve.

5. A projector according to claim 1, wherein said illuminated object is composed of a light valve composed of ferroelectric liquid crystal capable of forming an image by modulating the light, and said illuminating optical system includes a polarizing beam splitter for separating the light, prior to the entry into said light valve, into polarized lights of mutually different polarizing directions and directing one of said polarized lights towards said light valve.

6. A projector according to claim 1, wherein said illuminated object is composed of a light valve composed of PLZT capable of forming an image by modulating the light, and said illuminating optical system includes a polarizing beam splitter for separating the light, prior to the entry into said light valve, into polarized lights of mutually different polarizing directions and directing one of said polarized lights towards said light valve.

7. A projector according to claim 1, wherein said illuminating optical system has a concave mirror whose focusing point is positioned on said optical axis, said concave mirror is provided at the back of said light source, and said focusing point is substantially consistent with the high-luminance light-emitting area positioned nearer to said concave mirror of said two high-luminance light-emitting areas.

8. An illuminating apparatus comprising:
  a light source having first and second high-luminance light-emitting areas; and
  an illuminating optical system for directing the light from said light source toward an object to be illuminated, wherein said first and second high-luminance light-emitting areas are positioned on the optical axis of said illuminating optical system;
  wherein said illuminating optical system is constructed in such a manner that multiple rays of light emitted from a point in said first high-luminance light-emitting area are imaged on a central area of said illuminated object such that said multiple rays of light converge at one point in said central area and that multiple rays of light emitted from respective points in each of said first and second high-luminance light-emitting areas are imaged on a peripheral area of said illuminated object such that said multiple rays of light emitted from said respective points in each of said first and second high-luminance light-emitting areas converge at points in said peripheral area.

9. An illuminating apparatus according to claim 8, wherein said illuminating optical system has a concave mirror whose focusing point is positioned on said optical axis, said concave mirror is provided at the back of said light source, and said focusing point is substantially consistent with the high-luminance light-emitting area positioned nearer to said concave mirror of said two high-luminance light-emitting areas.

10. A projector comprising:
  a white light source having first and second high-luminance light-emitting areas;
  an illuminating optical system for receiving a white light from said light source, wherein said first and second high-luminance light-emitting areas are positioned on the optical axis of said illuminating optical system;
  color separation means for separating said white light into component lights of red, green and blue;
  three modulation means for forming image lights respectively corresponding to said component lights of red, green and blue;
  color synthesis means for synthesizing said image lights; and
  a projection optical system for projecting thus synthesized image lights;
  wherein said illuminating optical system is constructed in such a manner that multiple rays of light emitted from a point in said first high-luminance light-emitting area are imaged on a central area of said modulation means such that said multiple rays of light converge at one point in said central area and that multiple rays of light emitted from respective points in each of said first and second high-luminance light-emitting areas are imaged on a peripheral area of said modulation means such that said multiple rays of light emitted from said respective points in each of said first and second high-luminance light-emitting areas converge at points in said peripheral area.

11. A projector according to claim 10, wherein said illuminating optical system has a concave mirror whose focusing point is positioned on said optical axis, said concave mirror is provided at the back of said light source, and said focusing point is substantially consistent with the high-luminance light-emitting area positioned nearer to said concave mirror of said two high-luminance light-emitting areas.

12. A projector comprising:
  a light source having first and second high-luminance light-emitting areas;
  an illuminating optical system for directing light from said light source toward an object to be illuminated, provided with a reflector of a first focal length, wherein said first and second high-luminance light-emitting areas are positioned on an optical axis of said illuminating optical system;
  a projection optical system for projecting the light emerging from said illuminated object; and
  an optical element provided in the vicinity of said optical axis and having a second focal length smaller than said first focal length;
  wherein said light source, said illuminating optical system and said optical element are positioned in such a manner that light from said first high-luminance light-emitting area, emerging from said reflector, and light from said second high-luminance light-emitting area, emerging from said optical element, illuminate a peripheral area of said illuminated object.

13. A projector according to claim 12, wherein said reflector is an elliptical mirror having a first focal point in said first high-luminance light-emitting area and a second focal point on said illuminated object, and said optical element is a lens of a positive refractive power, positioned adjacent to said elliptical mirror.

14. An projector according to claim 12, wherein said reflector is an elliptical mirror having a first focal point in said first high-luminance light-emitting area and a second focal point on said illuminated object, and said optical element is an elliptical mirror having a focal point in a position between said first and second high-luminance light-emitting areas.

15. An illuminating apparatus comprising:
  a light source having first and second high-luminance light-emitting areas;
  an illuminating optical system provided with a reflector of a first focal length, for directing light from said light source toward an object to be illuminated, wherein said first and second high-luminance light-emitting areas are positioned on an optical axis of said illuminating optical system; and an optical element provided in the vicinity of said optical axis and having a second focal length smaller than said first focal length;

wherein said light source, said illuminating optical system and said optical element are positioned in such a manner that light from said first high-luminance light-emitting area, emerging from said reflector, and light from said second high-luminance light-emitting area, emerging from said optical element, illuminate a peripheral area of said illuminated object.

16. A projector comprising:

a white light source having first and second high-luminance light-emitting areas;

an illuminating optical system provided with a reflector of a first focal length for reflecting a white light from said light source, wherein said first and second high-luminance light-emitting areas are positioned on an optical axis of said illuminating optical system;

color separation means for separating said white light into component lights of red, green and blue;

three modulation means for forming image lights respectively corresponding to said component lights of red, green and blue;

color synthesis means for synthesizing said image lights;

a projection optical system for projecting thus synthesized image lights; and an optical element provided in the vicinity of said optical axis and having a second focal length smaller than said first focal length;

wherein said light source, said illuminating optical system and said optical element are positioned in such a manner that light from said first high-luminance light-emitting area, emerging from said reflector, and light from said second high-luminance light-emitting area, emerging from said optical element, illuminate a peripheral area of said illuminated object.

17. A projector comprising:

a light source;

an illuminating optical system for illuminating an object to be illuminated with light from said light source, wherein said light from said light source includes a plurality of light beams each of which illuminates a corresponding off axis point on said object;

a projection optical system for receiving said plural light beams through said object and for projecting an image of said object, said projection optical system having a plurality of pupils each of which is defined in accordance with a vignetting for the light beam from each off axis points on said object; and means for controlling an incident angle, to said object, of a ray at a center of gravity of each of said light beams such that the ray at the center of gravity of each light beam is substantially directed to a center of the corresponding pupil of said plural pupils.

18. A projector according to claim 17, wherein said illuminating optical system is provided, behind said light source, with a mirror of a parabolic reflecting face of which focal point is positioned substantially at the light emitting area of said light source, and said incident angle controlling means is adapted to receive the light from said light source, by way of said mirror.

19. A projector according to claim 17, wherein said illuminating optical system includes a mirror of aspherical reflecting face of which the center of curvature is positioned substantially at the light-emitting area of said light source, and a collimating lens system of which focal point is positioned substantially at the light-emitting area of said light source, and said incident angle controlling means is adapted to receive the light from said light source, by way of said mirror and said collimating lens system.

20. A projector according to claim 17, wherein said illuminating optical system includes a mirror of an elliptical reflecting face of which the first focal point is positioned substantially at the light-emitting area of said light source, and a collimating lens system of which focal point is positioned substantially at the second focal point of the elliptical reflecting face of said mirror, and said incident angle controlling means is adapted to receive the light from said light source, by way of said mirror and said collimating lens system.

21. A projector according to claim 17, wherein said incident angle controlling means includes an aspherical lens of which curvature is varied between the central and peripheral areas thereof in order to control the incident angle of the ray of center of gravity of each of said light beams into the illuminated object.

22. A projector according to claims 21, wherein said aspherical lens is positioned close to the illuminated object and satisfies a relation:

$$\Delta x/2NA \le e_1 \le f$$

wherein $e_1$ is the axial distance between the aspherical face of said aspherical lens and said illuminated object, f is the focal length of said aspherical lens, NA is the numerical aperture of said projection optical system at the side of said illuminated object, and $\Delta x$ is the alignment error between the center of said illuminated object and that of said aspherical lens.

23. A projector according to claim 21, wherein said aspherical lens has an aspherical face at the side of said light source, and a spherical face at the side of said illuminated object.

24. A projector according to claim 21, wherein said incident angle controlling means includes aspherical lens between said aspherical lens and said illuminated object.

25. A projector according to claim 17, wherein said incident angle controlling means includes a lens of distributed refractive index, of which refractive index is varied between the central and peripheral areas thereof, in order to control the incident angle of the ray of center of gravity in each of said light beams into the illuminated object.

26. A projector according to claim 25, wherein said lens of distributed refractive index has mutually parallel faces at the side of said light source and at the side of said illuminated object.

27. A projector according to claims 17, wherein said illuminated object includes a liquid crystal device for displaying an image in response to an input signal.

28. A projector comprising:

a white light source:

color separation means for separating a white light from said white light source into component lights of red, green and blue;

three modulating means for forming image lights respectively corresponding to said component lights of red, green and blue, wherein each of said component lights includes a plurality of light beams each of which illuminates a corresponding off axis point on said modulating means;

color synthesis means for synthesizing said image lights of red, green and blue;

a projection optical system for receiving thus synthesized image lights of red, green and blue, each of which includes said plural light beams illuminating the off axis points on said modulating means, said projection optical system having a plurality of pupils each of which is defined in accordance with a vignetting for the light beams from each off axis points on said modulating means; and means for controlling an incident angle, to said modulating means of a ray at a center of gravity of each of said light beams such that the ray at the center of gravity of each light beams is directed to a center of corresponding pupil of said plural pupils.

29. A projector according to claim 17, wherein said illuminating optical system is provided, behind said light source, with a mirror of a spherical reflecting face of which focal point is positioned substantially at the light emitting area of said light source, and said incident angle controlling means is adapted to receive the light from said light source, by way of said mirror.

30. A projector comprising:

a light source having first and second high-luminance light-emitting areas:

an illuminating optical system for directing light, from said light source, toward an object to be illuminated, wherein said first and second high-luminance light-emitting areas are positioned on an optical axis of said illuminating optical system; and a projection optical system for projecting the light emerging from said illuminated object;

wherein said illuminating optical system is constructed in such a manner that a central area of said illuminated object is illuminated by a light beam from said first high-luminance light-emitting area, and a peripheral area of said illuminated object is illuminated by light beams from said first and second high-luminance light emitting areas;

wherein said illuminating optical system includes:
 a reflector for reflecting the light from said light source; and
 a lens positioned in the path of the light emerging from said reflector, said lens being provided with an entrance face having a positive refractive power only in the vicinity of the optical axis of said illuminating optical system and being free from refractive power in other areas, and an exit face having a positive power over the entire area.

31. A projector comprising:

a light source having first and second high-luminance light-emitting areas;

an illuminating optical system for directing light, from said light source, toward an object to be illuminated, wherein said first and second high-luminance light-emitting areas are positioned on an optical axis of said illuminating optical system; and a projection optical system for projecting the light emerging from said illuminated object;

wherein said illuminating optical system is constructed in such a manner that a central area of said illuminated object is illuminated by a light beam from said first high-luminance light-emitting area, and a peripheral area of said illuminated object is illuminated by light beams from said first and second high-luminance light emitting areas;

wherein said illuminating optical system includes:
 a main elliptical mirror having a first focal point in said first high-luminance light-emitting area and a second focal point on the axial point of said illuminated object; and
 a sub elliptical mirror having a focal point on an axial point displaced from said first focal point of said main elliptical mirror toward said illuminated object.

32. A projector comprising:

light source having first and second high-luminance light emitting areas;

an illuminating optical system for directing light, from said light source, toward an object to be illuminated, wherein said first and second high-luminance light-emitting areas are positioned on an optical axis of said illuminating optical system; and a projection optical system for projecting the light emerging from said illuminated object;

wherein said illuminating optical system is constructed in such a manner that a central area of said illuminated object is illuminated by a light beam from said first high-luminance light-emitting area, and a peripheral area of said illuminated object is illuminated by light beams from said first and second high-luminance light emitting areas;

wherein said illuminating optical system includes:
 a reflector for reflecting the light from said light source; and
 a lens provided in the path of light emerging from said reflector, said lens having a negative refractive power in the peripheral area thereof and being free from refractive power in other areas.

\* \* \* \* \*

UNITED STATES PATENT AND TRADEMARK OFFICE
CERTIFICATE OF CORRECTION

PATENT NO.    : 5,692,819
DATED         : December 2, 1997
INVENTOR(S)   : Hideaki Mitsutake et al.

It is certified that errors appear in the above-identified patent and that said Letters Patent is hereby corrected as shown below:

Title page, "32 Claims" should read --31 Claims--.

Column 10, line 18,   after the word before, delete "."

Column 15, line 46,   delete "1"

Column 20, line 47,   delete "central"

Column 20, line 54,   delete entire Claim 3

Signed and Sealed this

Twenty-fourth Day of November, 1998

Attest:

BRUCE LEHMAN

Attesting Officer

Commissioner of Patents and Trademarks